US009275336B2

(12) United States Patent
Goyal et al.

(10) Patent No.: US 9,275,336 B2
(45) Date of Patent: Mar. 1, 2016

(54) METHOD AND SYSTEM FOR SKIPPING OVER GROUP(S) OF RULES BASED ON SKIP GROUP RULE

(71) Applicant: CAVIUM, INC., San Jose, CA (US)

(72) Inventors: Rajan Goyal, Saratoga, CA (US); Kenneth A. Bullis, Los Altos, CA (US)

(73) Assignee: Cavium, Inc., San Jose, CA (US)

( * ) Notice: Subject to any disclaimer, the term of this patent is extended or adjusted under 35 U.S.C. 154(b) by 199 days.

(21) Appl. No.: 14/145,374

(22) Filed: Dec. 31, 2013

(65) Prior Publication Data

US 2015/0186781 A1    Jul. 2, 2015

(51) Int. Cl.
*G06N 99/00*    (2010.01)
*G06N 5/04*    (2006.01)

(52) U.S. Cl.
CPC ............... *G06N 5/04* (2013.01); *G06N 99/005* (2013.01)

(58) Field of Classification Search
CPC ........... G06N 5/04; G06N 5/02; G06N 99/00; G06N 99/005
USPC ...................................................... 706/14, 47
See application file for complete search history.

(56) References Cited

U.S. PATENT DOCUMENTS

| | | | |
|---|---|---|---|
| 5,107,361 A | 4/1992 | Kneidinger et al. |
| 5,463,777 A | 10/1995 | Bialkowski et al. |
| 5,893,142 A | 4/1999 | Moyer et al. |
| 6,233,575 B1 | 5/2001 | Agrawal et al. |
| 6,298,340 B1 | 10/2001 | Calvignac et al. |
| 6,467,019 B1 | 10/2002 | Washburn |
| 6,473,763 B1 | 10/2002 | Corl et al. |
| 6,476,763 B2 | 11/2002 | Allen |
| 6,510,509 B1 | 1/2003 | Chopra et al. |
| 6,587,466 B1 | 7/2003 | Bhattacharya et al. |

(Continued)

FOREIGN PATENT DOCUMENTS

| | | |
|---|---|---|
| EP | 2 276 217 A2 | 1/2011 |
| WO | 2004/013777 A1 | 2/2004 |

(Continued)

OTHER PUBLICATIONS

Yu, F., "High Speed Deep Packet Inspection with Hardware Support", Dissertation—University of California, Berkeley, Fall 2006.*

(Continued)

*Primary Examiner* — Jeffrey A Gaffin
*Assistant Examiner* — Dave Misir
(74) *Attorney, Agent, or Firm* — Lathrop & Gage LLP; Weber Hsiao

(57) ABSTRACT

A method and corresponding system for providing a skip group rule feature is disclosed. When a search for a key matches a skip group rule in a group of prioritized rules, the search skips over rules having priorities lower than the skip group rule and the search continues to a next group. A convenient example of a compiler rewrites the lower priority rules by subtracting the skip group rule from them. The subtraction includes subtracting range, exact-match, mask, and prefix fields. The rewritten rules appear to a search processor as typical rules. Beneficially, the search processor requires no additional logic to process a skip group rule, skip over lower priority rules, and go on to search a next group of rules. Advantageously, this approach enables any number of skip group rules to be defined allowing for better classification of network data.

13 Claims, 17 Drawing Sheets

(56) References Cited

U.S. PATENT DOCUMENTS

| | | | |
|---|---|---|---|
| 6,735,600 B1 | 5/2004 | Andreev | |
| 6,868,414 B2 | 3/2005 | Khanna et al. | |
| 6,980,555 B2 | 12/2005 | Mar | |
| 7,039,641 B2 | 5/2006 | Woo | |
| 7,046,848 B1 | 5/2006 | Olcott | |
| 7,225,188 B1 | 5/2007 | Gai et al. | |
| 7,260,558 B1 | 8/2007 | Cheng et al. | |
| 7,366,728 B2 | 4/2008 | Corl et al. | |
| 7,370,361 B2 | 5/2008 | de los Santos et al. | |
| 7,415,472 B2 | 8/2008 | Testa | |
| 7,441,022 B1 | 10/2008 | Schuba et al. | |
| 7,509,300 B2 | 3/2009 | Sahni et al. | |
| 7,536,476 B1 | 5/2009 | Alleyne | |
| 7,546,234 B1 | 6/2009 | Deb et al. | |
| 7,571,156 B1 | 8/2009 | Gupta et al. | |
| 7,594,081 B2 | 9/2009 | Bouchard et al. | |
| 7,613,926 B2 | 11/2009 | Edery et al. | |
| 7,634,408 B1 | 12/2009 | Mohri | |
| 7,636,717 B1 | 12/2009 | Gupta et al. | |
| 7,702,629 B2 | 4/2010 | Cytron et al. | |
| 7,710,988 B1 | 5/2010 | Tripathi et al. | |
| 7,711,893 B1 | 5/2010 | Venkatachary | |
| 7,870,161 B2 | 1/2011 | Wang | |
| 7,937,355 B2 | 5/2011 | Corl et al. | |
| 7,949,683 B2 | 5/2011 | Goyal | |
| 7,962,434 B2 | 6/2011 | Estan et al. | |
| 8,005,869 B2 | 8/2011 | Corl et al. | |
| 8,015,085 B2 | 9/2011 | Blagg et al. | |
| 8,024,802 B1 | 9/2011 | Preston | |
| 8,051,085 B1 | 11/2011 | Srinivasan et al. | |
| 8,156,507 B2 | 4/2012 | Brjazovski et al. | |
| 8,180,803 B2 | 5/2012 | Goyal | |
| 8,301,788 B2 | 10/2012 | Bouchard et al. | |
| 8,392,590 B2 | 3/2013 | Bouchard et al. | |
| 8,407,794 B2 | 3/2013 | Kim et al. | |
| 8,447,120 B2 | 5/2013 | Ji et al. | |
| 8,473,523 B2 | 6/2013 | Goyal | |
| 8,477,611 B2 | 7/2013 | Lim | |
| 8,543,528 B2 | 9/2013 | Lunteren | |
| 8,554,698 B2 | 10/2013 | Bando et al. | |
| 8,566,344 B2 | 10/2013 | Bando et al. | |
| 8,856,203 B1 | 10/2014 | Schelp et al. | |
| 8,934,488 B2 | 1/2015 | Goyal et al. | |
| 8,937,952 B2 | 1/2015 | Goyal et al. | |
| 8,937,954 B2 | 1/2015 | Goyal et al. | |
| 8,990,259 B2 | 3/2015 | Billa et al. | |
| 2002/0023089 A1 | 2/2002 | Woo | |
| 2003/0156586 A1 | 8/2003 | Lee et al. | |
| 2003/0223421 A1 | 12/2003 | Rich et al. | |
| 2004/0006668 A1 | 1/2004 | Park et al. | |
| 2004/0162826 A1 | 8/2004 | Wyschogrod et al. | |
| 2004/0172234 A1 | 9/2004 | Dapp et al. | |
| 2004/0225999 A1 | 11/2004 | Nuss | |
| 2005/0013293 A1 | 1/2005 | Sahita | |
| 2005/0028114 A1 | 2/2005 | Gould et al. | |
| 2005/0035784 A1 | 2/2005 | Gould et al. | |
| 2005/0114602 A1* | 5/2005 | Ngai | G11C 15/00 711/128 |
| 2005/0177736 A1 | 8/2005 | de los Santos et al. | |
| 2005/0238010 A1 | 10/2005 | Panigrahy et al. | |
| 2005/0240604 A1 | 10/2005 | Corl et al. | |
| 2005/0278781 A1 | 12/2005 | Zhao et al. | |
| 2006/0002386 A1 | 1/2006 | Yik et al. | |
| 2006/0026138 A1 | 2/2006 | Robertson et al. | |
| 2006/0039372 A1 | 2/2006 | Sarkinen et al. | |
| 2006/0059165 A1 | 3/2006 | Bosloy et al. | |
| 2006/0059314 A1 | 3/2006 | Bouchard et al. | |
| 2006/0069872 A1 | 3/2006 | Bouchard et al. | |
| 2006/0075206 A1 | 4/2006 | Bouchard et al. | |
| 2006/0085533 A1 | 4/2006 | Hussain et al. | |
| 2006/0101195 A1 | 5/2006 | Jain | |
| 2006/0136570 A1 | 6/2006 | Pandya | |
| 2006/0155915 A1 | 7/2006 | Pereira | |
| 2007/0168377 A1 | 7/2007 | Zabarsky | |
| 2007/0192863 A1 | 8/2007 | Kapoor et al. | |
| 2008/0031258 A1 | 2/2008 | Acharya et al. | |
| 2008/0034427 A1 | 2/2008 | Cadambi et al. | |
| 2008/0059464 A1 | 3/2008 | Law et al. | |
| 2008/0071783 A1 | 3/2008 | Langmead et al. | |
| 2008/0082946 A1 | 4/2008 | Zilic et al. | |
| 2008/0097959 A1 | 4/2008 | Chen et al. | |
| 2008/0101371 A1 | 5/2008 | Law et al. | |
| 2008/0109392 A1 | 5/2008 | Nandy | |
| 2008/0109431 A1 | 5/2008 | Kori | |
| 2008/0140600 A1 | 6/2008 | Pandya | |
| 2008/0140631 A1 | 6/2008 | Pandya | |
| 2008/0229415 A1 | 9/2008 | Kapoor et al. | |
| 2008/0232359 A1* | 9/2008 | Kim | H04L 63/0245 370/389 |
| 2008/0262991 A1 | 10/2008 | Kapoor et al. | |
| 2008/0270833 A1 | 10/2008 | McMillen | |
| 2008/0271147 A1 | 10/2008 | Mohanan et al. | |
| 2009/0063825 A1 | 3/2009 | McMillen et al. | |
| 2009/0119279 A1 | 5/2009 | Goyal et al. | |
| 2009/0119399 A1 | 5/2009 | Hussain et al. | |
| 2009/0125470 A1 | 5/2009 | Shah et al. | |
| 2009/0138440 A1 | 5/2009 | Goyal | |
| 2009/0138494 A1 | 5/2009 | Goyal | |
| 2009/0185568 A1 | 7/2009 | Cho et al. | |
| 2009/0274384 A1 | 11/2009 | Jakobovits | |
| 2010/0034202 A1 | 2/2010 | Lu et al. | |
| 2010/0037056 A1 | 2/2010 | Follis et al. | |
| 2010/0067535 A1 | 3/2010 | Ma et al. | |
| 2010/0094906 A1 | 4/2010 | Della-Libera et al. | |
| 2010/0095162 A1 | 4/2010 | Inakoshi | |
| 2010/0110936 A1 | 5/2010 | Bailey et al. | |
| 2010/0114973 A1 | 5/2010 | Goyal | |
| 2010/0146623 A1 | 6/2010 | Namjoshi et al. | |
| 2010/0153420 A1 | 6/2010 | Yang et al. | |
| 2010/0158394 A1 | 6/2010 | Chang et al. | |
| 2010/0175124 A1 | 7/2010 | Miranda | |
| 2010/0192225 A1 | 7/2010 | Ma et al. | |
| 2010/0199355 A1 | 8/2010 | Ouddan et al. | |
| 2011/0016154 A1 | 1/2011 | Goyal et al. | |
| 2011/0038375 A1 | 2/2011 | Liu et al. | |
| 2011/0093484 A1 | 4/2011 | Bando et al. | |
| 2011/0093496 A1 | 4/2011 | Bando et al. | |
| 2011/0113191 A1 | 5/2011 | Pandya | |
| 2011/0119440 A1 | 5/2011 | Pandya | |
| 2011/0137930 A1 | 6/2011 | Hao et al. | |
| 2011/0173149 A1 | 7/2011 | Schon | |
| 2011/0173490 A1 | 7/2011 | Narayanaswamy et al. | |
| 2011/0185077 A1 | 7/2011 | Bremler-Barr et al. | |
| 2011/0219010 A1 | 9/2011 | Lim | |
| 2011/0238855 A1 | 9/2011 | Korsunsky et al. | |
| 2011/0295779 A1 | 12/2011 | Chen et al. | |
| 2012/0017262 A1 | 1/2012 | Kapoor et al. | |
| 2012/0078832 A1 | 3/2012 | Lunteren | |
| 2012/0143854 A1 | 6/2012 | Goyal et al. | |
| 2012/0203718 A1 | 8/2012 | Biran et al. | |
| 2012/0221494 A1 | 8/2012 | Pasetto et al. | |
| 2012/0311529 A1 | 12/2012 | Beveridge et al. | |
| 2012/0331007 A1 | 12/2012 | Billa et al. | |
| 2012/0331554 A1 | 12/2012 | Goyal et al. | |
| 2013/0034100 A1* | 2/2013 | Goyal | G06N 5/02 370/392 |
| 2013/0034106 A1* | 2/2013 | Goyal | G06N 5/02 370/400 |
| 2013/0036083 A1* | 2/2013 | Goyal | G06N 5/02 706/47 |
| 2013/0036102 A1* | 2/2013 | Goyal | G06N 5/02 707/694 |
| 2013/0036152 A1* | 2/2013 | Goyal | G06N 5/02 709/201 |
| 2013/0036471 A1* | 2/2013 | Bouchard | G06N 5/02 726/23 |
| 2013/0036477 A1* | 2/2013 | Goyal | G06N 5/02 726/27 |
| 2013/0039366 A1 | 2/2013 | Goyal et al. | |
| 2013/0060727 A1 | 3/2013 | Goyal et al. | |
| 2013/0070753 A1 | 3/2013 | Sahni et al. | |
| 2013/0085978 A1 | 4/2013 | Goyal et al. | |
| 2013/0133064 A1 | 5/2013 | Goyal et al. | |
| 2013/0191916 A1 | 7/2013 | Yao et al. | |

(56) References Cited

U.S. PATENT DOCUMENTS

| | | | |
|---|---|---|---|
| 2013/0218853 A1* | 8/2013 | Bullis | H04L 41/0816 707/694 |
| 2013/0232104 A1 | 9/2013 | Goyal et al. | |
| 2013/0239193 A1* | 9/2013 | Bouchard | H04L 45/742 726/7 |
| 2013/0282766 A1 | 10/2013 | Goyal et al. | |
| 2014/0214749 A1 | 7/2014 | Ruehle | |
| 2014/0279805 A1* | 9/2014 | Pangborn | H04L 45/00 706/47 |
| 2014/0279806 A1* | 9/2014 | Ansari | H04L 45/00 706/47 |
| 2014/0279850 A1* | 9/2014 | Goyal | G06F 17/30365 707/609 |
| 2014/0280357 A1 | 9/2014 | Goyal et al. | |
| 2014/0281809 A1 | 9/2014 | Goyal et al. | |
| 2015/0066927 A1 | 3/2015 | Goyal et al. | |
| 2015/0067123 A1 | 3/2015 | Goyal et al. | |
| 2015/0067200 A1 | 3/2015 | Goyal et al. | |
| 2015/0067776 A1 | 3/2015 | Goyal et al. | |
| 2015/0067836 A1 | 3/2015 | Billa et al. | |
| 2015/0117461 A1 | 4/2015 | Goyal et al. | |
| 2015/0186786 A1 | 7/2015 | Goyal et al. | |
| 2015/0220454 A1 | 8/2015 | Goyal et al. | |
| 2015/0220845 A1 | 8/2015 | Goyal et al. | |

FOREIGN PATENT DOCUMENTS

| | | |
|---|---|---|
| WO | 2007/109445 A1 | 9/2007 |
| WO | 2008/005772 A2 | 1/2008 |
| WO | 2009/145712 A1 | 12/2009 |
| WO | 2012/177736 A1 | 12/2012 |
| WO | 2012/177752 A1 | 12/2012 |
| WO | 2013/020002 A1 | 2/2013 |
| WO | 2013/020003 A1 | 2/2013 |
| WO | 2013/078053 A1 | 5/2013 |

OTHER PUBLICATIONS

Moon D. et al., "Bridging the Software/Hardware Forwarding Divide", Technical Report, University of California at Berkeley, 2010.*

Abdelghani et al. (2005) "Packet Classification Using Adaptive Rule Cutting," In; The IEEE Proc. of Adv. Indus. Conf. on Telecom. pp. 28-33.

Aho et al. (1977) Ch. 3 In; Principles of Compiler Design. Addison-Wesley. pp. 73-124.

Baboescu et al. (2001) "Scalable Packet Classification," In; The Proceedings of the ACM SIGCOMM '01 Conference on Applications, Technologies, Architectures, and Protocols for Computer Communication. pp. 199-210.

Baboescu et al. (2003) "Packet Classification for Core Routers: Is there an alternative to CAMs?" In; The Twenty-Second Annual Joint Conference of the IEEE Computer and Communications, INFOCOM 2003. vol. 1. pp. 53-63.

Becchi et al (2008) "Extending Finite Automata to Efficiently Match Perl-compatible Regular Expressions," In; The Proceedings of the 2008 CoNext Conference. Dec. 9-12, 2008.

Becchi et al. (2007) "A Hybrid Finite Automaton for Practical Deep Packet Inspection," In; The Proceedings of the International Conference on emerging Networking EXperiments and Technologies (CoNEXT), New York, New York. Dec. 2007.

Becchi et al. (2009) "Data Structures, Algorithms and Architechtures for Efficient Regular Expression Evaluation," Washington University. Dissertation for the degree of Doctor of Philosophy. Saint Louis, Missouri.

Branch et al. (2002) "Denial of Service Intrusion Detection Using Time Dependent Deterministic Finite Automata," In; The Proc. Research Conference, Troy, NY, Oct. 2002.

Chodnicki (2011) "An Introduction to Regular Expressions/Adventures with Open Source BI," Adventures with Open Source BI. Accessible on the Internet at URL: available at http://type-exit.org/adventures-with-open-source-bi/2011/05/an-introduction-to-regular-expressions. [Last Accessed Aug. 21, 2015].

Faro et al. (2008) "Efficient Variants of the Backward-Oracle-Matching Algorithm," In; The Proceedings of Prague Stringology Conference, 2008, pp. 146-160.

Gupta et al. (1999) "Packet Classification on Multiple Fields," In; The Proceedings of SIGCOMM '99 Conference on Applications, Technologies, Architectures, and Protocols for Computer Communication (SIGCOMM '99). pp. 147-160.

Gupta et al. (2000) "Classifying Packets With Hierarchical Intelligent Cuttings," IEEE Micro. 20(1):34-41.

Gupta (2000) "Algorithms for Packet Routing Lookups and Packet Classification," Stanford University. Dissertation for the degree of Doctor of Philosophy.

Hoperoft et al. (1979) Ch. 2 In; Introduction to Automata Theory, Languages, and Computation. Addison-Wesley. Reading, Massachusetts.

Wikipedia "Access control list," Wikimedia Foundation, Inc. Accessible on the Internet at URL: https://en.wikipedia.org/wiki/Access_control_list. [Last Accessed Aug. 21, 2015].

Klarlund (1992) "Progress Measures, Immediate Determinacy, and a Subset Construction for Tree Automata," In; The Proceedings of the Seventh Annual IEEE Symposium on Logic in Computer Science, 1992. LICS '92. pp. 382-393.

Navarro (2001) "NR-grep: A Fast and Flexible Pattern Matching Tool," Software Practice and Experience (SPE). 31:1265-1312.

Navarro (2004) "Pattern Matching," Journal of Applied Statistics. 31(8):925-949.

Pong et al. (2011) "HARP: Rapid Packet Classification via Hashing Round-Down Prefixes," IEEE Transactions on Parallel and Distributed Systems. 22(7):1105-1119.

Qi et al. (2009) "Packet Classification Algorithms: From Theory to Practice," In; The Proceedings of the 28th IEEE conference on Computer Communications (INFOCOM '09). pp. 648-656.

Rabin et al. (1959) "Finite Automata and their Decision Problems," IBM Journal of Research and Development. 3(2):114-125.

Singh (2002) "Regular Expressions," Seeing With C. Accessible on th Internet at URL: http://www.seeingwithc.org/topic7html.html. [Last Accessed Aug. 24, 2014].

Singh et al. (2003) "Packet Classification Using Multidimensional Cutting," In; The Proceedings of the ACM SIGCOMM 03 Conference on Applications, Technologies, Architectures, and Protocols for Computer Communication (SIGCOMM 03). pp. 213-224.

Sipser (1997) "Introduction to the Theory of Computation," PWS Nondeterminism. Section 1.2 pp. 47-63.

Sun et al. (2008) "HFilter: Hybrid Finite Automaton Based Stream Filtering for Deep and Recursive XML Data," Database and Expert Systems Applications Lecture Notes in Computer Science. 5181:566-580.

Theiling (2001) "Generating Decision Trees for Decoding Binaries" In; The OM '01 Proceedings of the 2001 ACM SIGPLAN workshop on Optimization of middleware and distributed systems. pp. 112-120.

Yu et al. (2006) "A Novel IP Packet Classification Algorithm Based on Hierarchical Intelligent Cuttings," In; The Proceedings of the IEEE 6th International Conference on ITS Telecom. pp. 1033-1036.

Zhang et al. (2010) "On Constructing Efficient Shared Decision Trees for Multiple Packet Filters," In; IEEE INFOCOM'10. San Diego, California.

International Search Report with Written Opinion corresponding to International Patent Application No. PCT/US2012/043307, mailed Dec. 6, 2012.

International Search Report with Written Opinion corresponding to International Patent Application No. PCT/US2012/049406, mailed Oct. 18, 2010.

Office Action corresponding to U.S. Appl. No. 13/168,395, mailed Apr. 20, 2015.

Office Action corresponding to U.S. Appl. No. 13/168,395, mailed Dec. 24, 2014.

Office Action corresponding to U.S. Appl. No. 13/168,395, mailed Dec. 27, 2013.

Office Action corresponding to U.S. Appl. No. 13/168,395, mailed Jun. 10, 2014.

(56) References Cited

OTHER PUBLICATIONS

Office Action corresponding to U.S. Appl. No. 13/168,450, mailed Apr. 25, 2013.
Office Action corresponding to U.S. Appl. No. 13/168,450, mailed Feb. 28, 2014.
Office Action corresponding to U.S. Appl. No. 13/168,450, mailed Jun. 6, 2014.
Office Action corresponding to U.S. Appl. No. 13/168,450, mailed Oct. 8, 2014.
Office Action corresponding to United States Patent Application No. 13/565,775, mailed Aug. 26, 2014.
Office Action corresponding to United States Patent Application No. 13/565,775, mailed Feb. 9, 2015.
Office Action corresponding to United States Patent Application No. 13/831,191, mailed Dec. 12, 2014.
Office Action corresponding to United States Patent Application No. 13/831,191, mailed May 21, 2015.
Office Action corresponding to United States Patent Application No. 13/831,232, mailed Nov. 21, 2014.
Office Action corresponding to United States Patent Application No. 13/831,415, mailed Dec. 18, 2014.
Office Action corresponding to United States Patent Application No. 13/831,415, mailed Jun. 4, 2015.
Office Action corresponding to United States Patent Application No. 14/145,918, mailed Aug. 19, 2015.

* cited by examiner

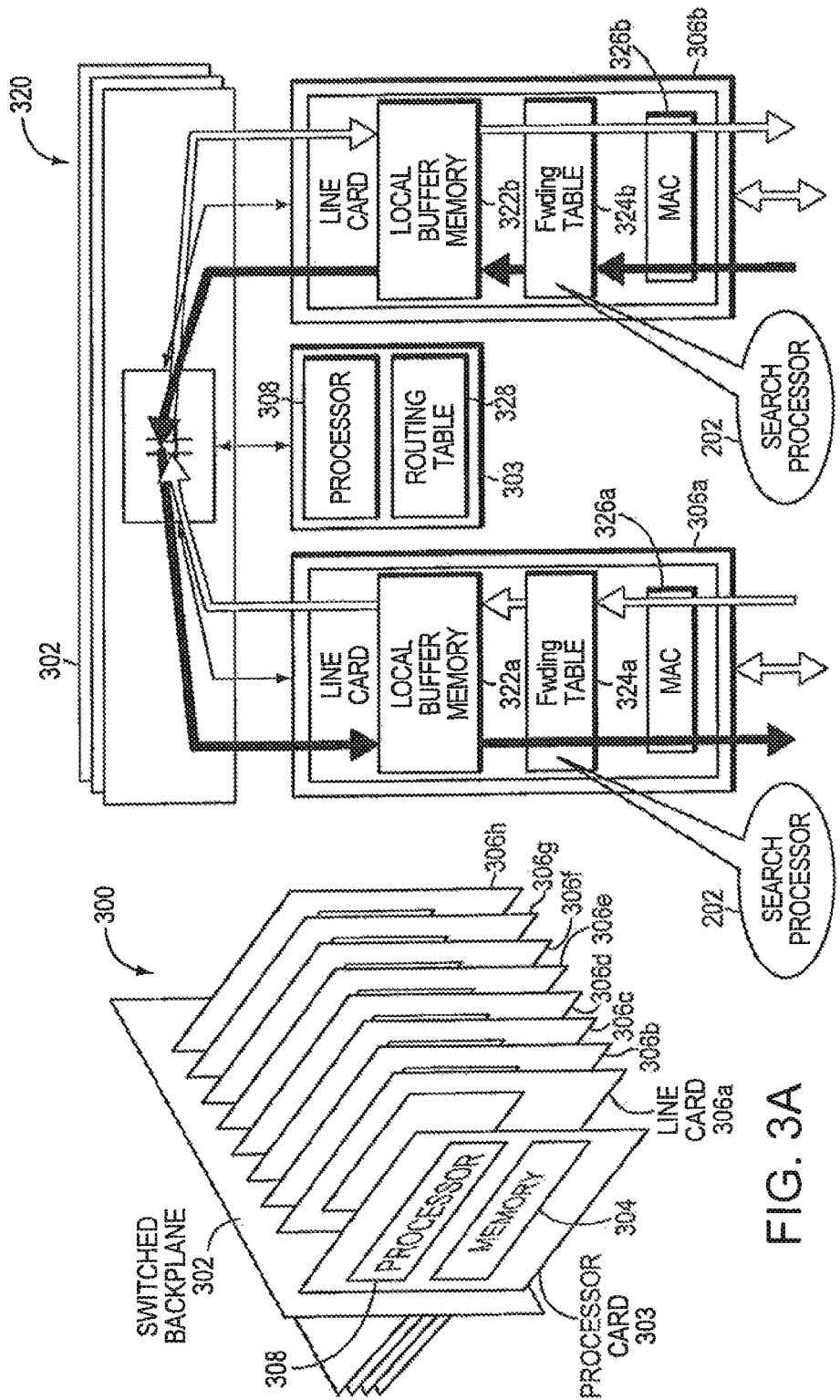

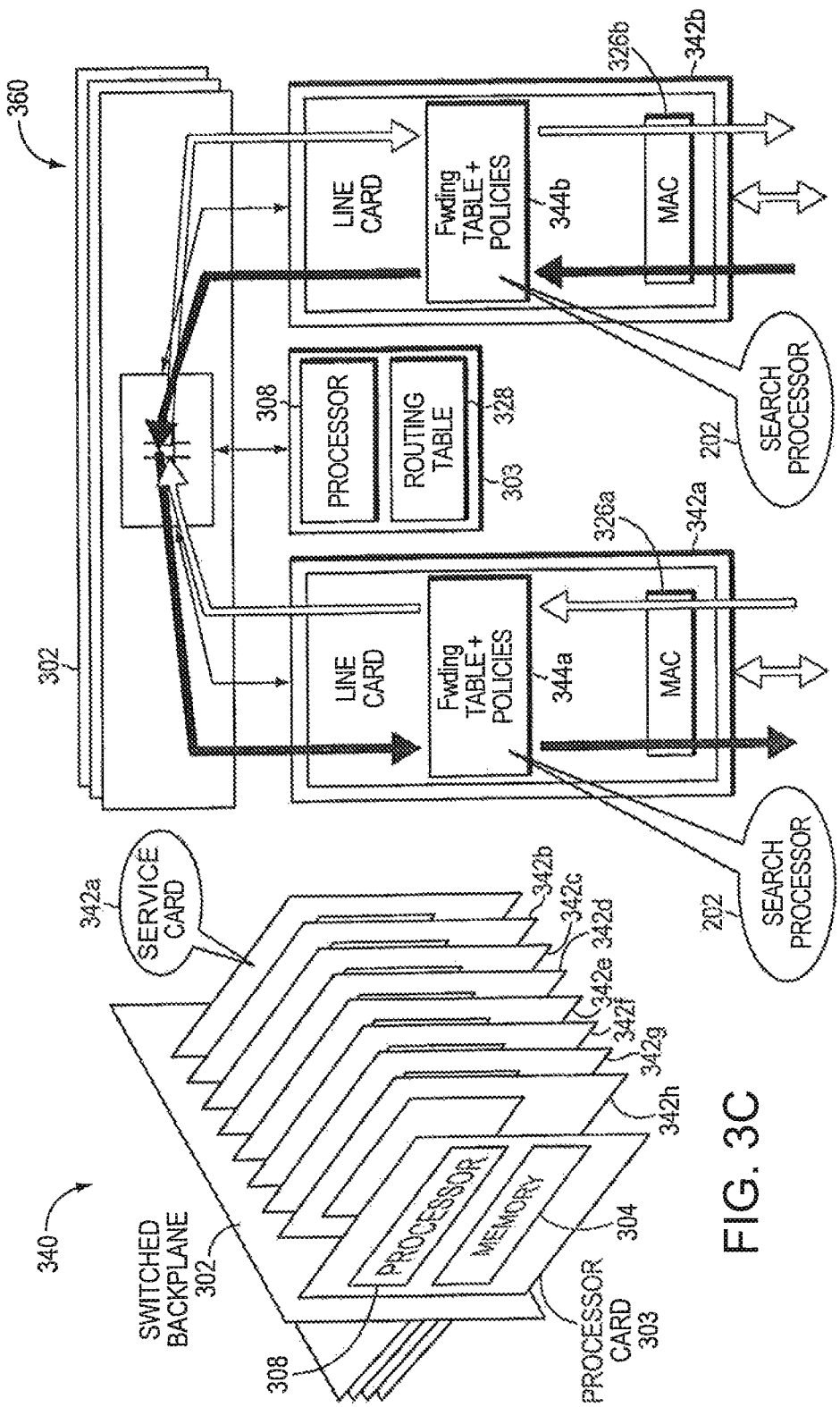

\* R2 and R5 are skip group rules.

▷ Key matches R2, R3, R5, R6, and R7.

Return R7.

| Prefix Mask of Lower Priority Rule (A) | − | Prefix Mask of Skip Group Rule (B) | ≈ | Prefix Mask for Rewritten Rule (c) |

A = 10XX = ({ 8, 9, 10, 11 })
     ↖LSB

B = 100X = ({ 8, 9 })
     ↖LSB

---

Inverse of Prefix Mask of Skip Group Rule (B')

B' = ( 0XXX or X1XX or XX1X )

---

Intersect A with B

10XX and ( 0XXX or X1XX or XX1X )

C = ( 10XX and 0XXX ) or ( 10XX and X1XX ) or ( 10XX and XX1X )

METHOD AND SYSTEM FOR SKIPPING OVER GROUP(S) OF RULES BASED ON SKIP GROUP RULE

BACKGROUND

The Open Systems Interconnection (OSI) Reference Model defines seven network protocol layers (L1-L7) used to communicate over a transmission medium. The upper layers (L4-L7) represent end-to-end communications and the lower layers (L1-L3) represent local communications.

Networking application aware systems need to process, filter and switch a range of L3 to L7 network protocol layers, for example, L7 network protocol layers such as, HyperText Transfer Protocol (HTTP) and Simple Mail Transfer Protocol (SMTP), and L4 network protocol layers such as Transmission Control Protocol (TCP). In addition to processing the network protocol layers, the networking application aware systems need to simultaneously secure these protocols with access and content based security through L4-L7 network protocol layers including Firewall, Virtual Private Network (VPN), Secure Sockets Layer (SSL), Intrusion Detection System (IDS), Internet Protocol Security (IPSec), Anti-Virus (AV) and Anti-Spam functionality at wire-speed.

Improving the efficiency and security of network operation in today's Internet world remains an ultimate goal for Internet users. Access control, traffic engineering, intrusion detection, and many other network services require the discrimination of packets based on multiple fields of packet headers, which is called packet classification.

Internet routers classify packets to implement a number of advanced internet services such as routing, rate limiting, access control in firewalls, virtual bandwidth allocation, policy-based routing, service differentiation, load balancing, traffic shaping, and traffic billing. These services require the router to classify incoming packets into different flows and then to perform appropriate actions depending on this classification.

A classifier, using a set of filters or rules, specifies the flows, or classes. For example, each rule in a firewall might specify a set of source and destination addresses and associate a corresponding deny or permit action with it. Alternatively, the rules might be based on several fields of a packet header including layers 2, 3, 4, and 5 of the OSI model, which contain addressing and protocol information.

On some types of proprietary hardware, an Access Control List (ACL) refers to rules that are applied to port numbers or network daemon names that are available on a host or layer 3 device, each with a list of hosts and/or networks permitted to use a service. Both individual servers as well as routers can have network ACLs. ACLs can be configured to control both inbound and outbound traffic.

SUMMARY

In accordance with an example, a method for forcing a search processor to skip over rules within a group of rules is provided. Given a set of rules for matching a key, the set of rules divided into groups, each group being prioritized with respect to each other and each rule within each group being prioritized with respect to each other, and the set of rules including at least one skip group rule, the method includes, in a compiler, rewriting rules belonging to a same group as the skip group rule and having priorities lower than the skip group rule. The lower priority rules being rewritten based on the skip group rule such that in response to matching a key to the skip group rule, a search processor skips over the skip group rule and the lower priority rules. The method further includes providing the rewritten rules to the search processor.

In accordance with another example, a system for forcing a search processor to skip over rules within a group of rules is provided. The system includes memory having computer executable instructions thereupon and at least one interface receiving a set of rules for matching a key, the set of rules divided into groups, each group being prioritized with respect to each other and each rule within each group being prioritized with respect to each other, and the set of rules including at least one skip group rule. The set of rules including at least one skip group rule. The system further includes a compiler coupled to the memory and at least one interface. The computer executable instructions when executed by the compiler cause the compiler to rewrite rules belonging to a same group as the skip group rule and having priorities lower than the skip group rule. The lower priority rules being rewritten based on the skip group rule such that in response to matching a key to the skip group rule, a search processor skips over the skip group rule and the lower priority rules. The compiler further caused to provide the rewritten rules to the search processor.

In accordance with yet another example, a tangible computer-readable storage medium having computer readable instructions stored therein for forcing a search processor to skip over rules within a group of rules is provided. The computer readable instructions when executed by a compiler provided with a set of rules for matching a key, the set of rules divided into groups, each group being prioritized with respect to each other and each rule within each group being prioritized with respect to each other, the set of rules including at least one skip group rule, cause the compiler to rewrite rules belonging to a same group as the skip group rule and having priorities lower than the skip group rule, the lower priority rules being rewritten based on the skip group rule such that in response to matching a key to the skip group rule, a search processor skips over the skip group rule and the lower priority rules. The compiler further caused to provide the rewritten rules to the search processor.

In some examples, any of the aspects above can include one or more of the following features.

In other examples of the method, rewriting the lower priority rules includes subtracting the skip group rule from each of the lower priority rules. Each lower priority rule being rewritten with a respective subtracted rule as one or more rewritten rules.

In some examples of the method, each rule includes at least one field. In these examples, subtracting includes subtracting, on a field-by-field basis, the skip group rule from each of the lower priority rules.

In other examples of the method, a group of rules includes a first skip group rule and a second skip group rule. In these examples, subtracting includes subtracting the first skip group rule from each of the lower priority rules and subtracting the second skip group rule from each of the lower priority rules having priorities lower than the second skip group rule.

In some examples of the method, subtracting includes, given the skip group rule including a field having a first range and each of the lower priority rules including a corresponding field having a second range, for each lower priority rule, subtracting the first range from a respective second range and including the subtracted second range in a rewritten rule.

In other examples of the method, the subtracted second range includes a first sub-range and a second sub-range, the first sub-range and second sub-range being included in a first rewritten rule and a second rewritten rule.

In some examples of the method, the first range and second range each includes one value.

In other examples of the method, subtracting includes, given the skip group rule including a field having a first bitmask and each of the lower priority rules including a corresponding field having a second bitmask, for each second bitmask, inverting the first bitmask and intersecting the inverted first bitmask with a subject second bitmask to form an third bitmask, and including the third bitmask in a rewritten rule.

In some examples of the method, inverting the first bitmask includes for each value bit in the first bitmask creating a mask value by inverting a subject value bit, and setting remain bits to don't-care bits. The method further includes or'ing the mask values to yield the inverted first bitmask value.

In other examples of the method, intersecting the inverted first bitmask with the subject second bitmask includes, bit-by-bit, intersecting a don't-care bit with another don't-care bit yields a don't-care bit in the third bitmask, intersecting a don't-care bit with a value bit yields the value bit in the third bitmask, intersecting a value bit with an equal value bit yields the value bit in the third bitmask, and intersecting a value bit with an unequal value bit yields the third bitmask having a null value.

In some examples of the method, the first bitmask and the second bitmask are prefixes in which don't-care bits are the least significant bits.

In other examples of the method, writing includes determining whether the skip group rule and a lower priority rule overlap. The method further includes rewriting the lower priority rule overlap based on the determination.

In some examples of the method, in an event, the determination is the skip group rule and lower priority rule do not overlap, the method includes writing the lower priority rule without change.

Other examples of the method further include coalescing two or more rewritten rules into a coalesced rule.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 3A is a diagram of an example embodiment of a router architecture.

FIG. 3B is a block diagram illustrating an example embodiment of a router employing a search processor.

FIG. 3C is a block diagram of another embodiment of a router including a switched backplane.

FIG. 3D is a block diagram illustrating an example embodiment of a router employing a search processor.

FIG. 10 is a diagram of an example of subtracting a skip group rule from a lower priority rule, each rule having a prefix field.

FIGS. 11A-11D are a series of diagrams showing an example of coalescing two or more rewritten rules together.

DETAILED DESCRIPTION

Figure 1:
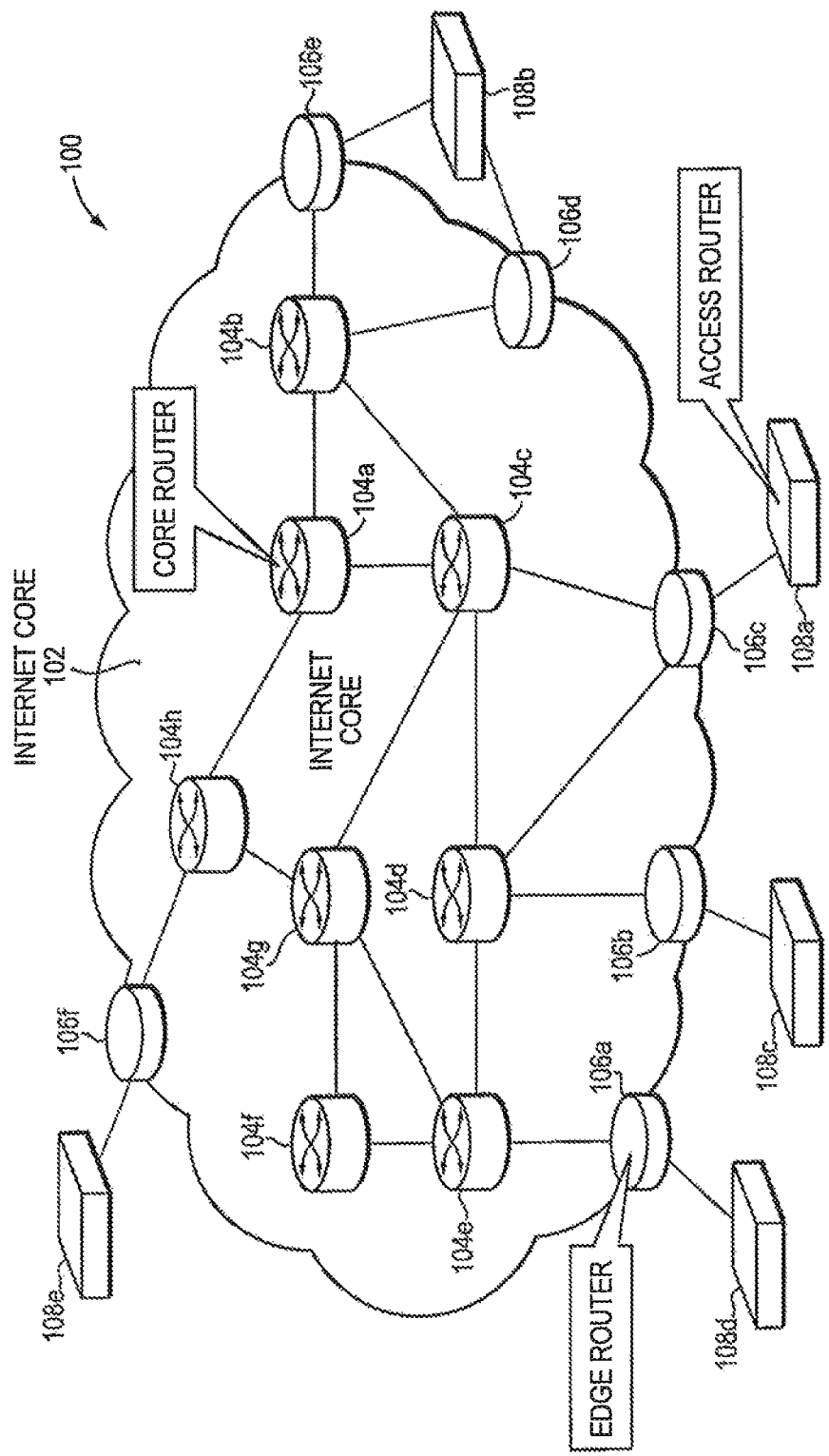
FIG. 1 is a block diagram of a typical network topology including network elements employing example embodiments of a search processor described in this application.

FIG. 1 is a block diagram 100 of a typical network topology including network elements employing example embodiments of a search processor. The network topology includes an Internet core 102 including a plurality of core routers 104a-h. Each of the plurality of core routers 104a-h are connected to at least one other of the plurality of core routers 104a-h. Core routers 104a-h that are on the edge of the Internet core 102 (i.e., core routers 102b-e and 102h) are coupled with at least one edge router 106a-f. Each edge router 106a-f is coupled to at least one access router 108a-e.

The core routers 104a-h are configured to operate in the Internet core 102 or Internet backbone. The core routers 104a-h are configured to support multiple telecommunications interfaces of the Internet core 102 and are further configured to forward packets at a full speed of each of the multiple telecommunications protocols.

The edge routers 106a-f are placed at the edge of the Internet core 102. Edge routers 106a-f bridge access routers 108a-e outside the Internet core 102 and core routers 104a-h in the Internet core 102. Edge routers 106a-f can be configured to employ a bridging protocol to forward packets from access routers 108a-e to core routers 104a-h and vice versa.

The access routers 108a-e can be routers used by an end user, such as a home user or an office, to connect to one of the edge routers 106a-f, which in turn connects to the Internet core 102 by connecting to one of the core routers 104a-h. In this manner, the edge routers 106a-f can connect to any other edge router 106a-f via the edge routers 106a-f and the interconnected core routers 104a-h.

A search processor described herein can reside in any of the core routers 104a-h, edge routers 106a-f, and access routers 108a-e. The search processor described herein, within each of these routers, is configured to analyze Internet protocol (IP) packets based on a set of rules and forward the IP packets along an appropriate network path.

Figure 2A:
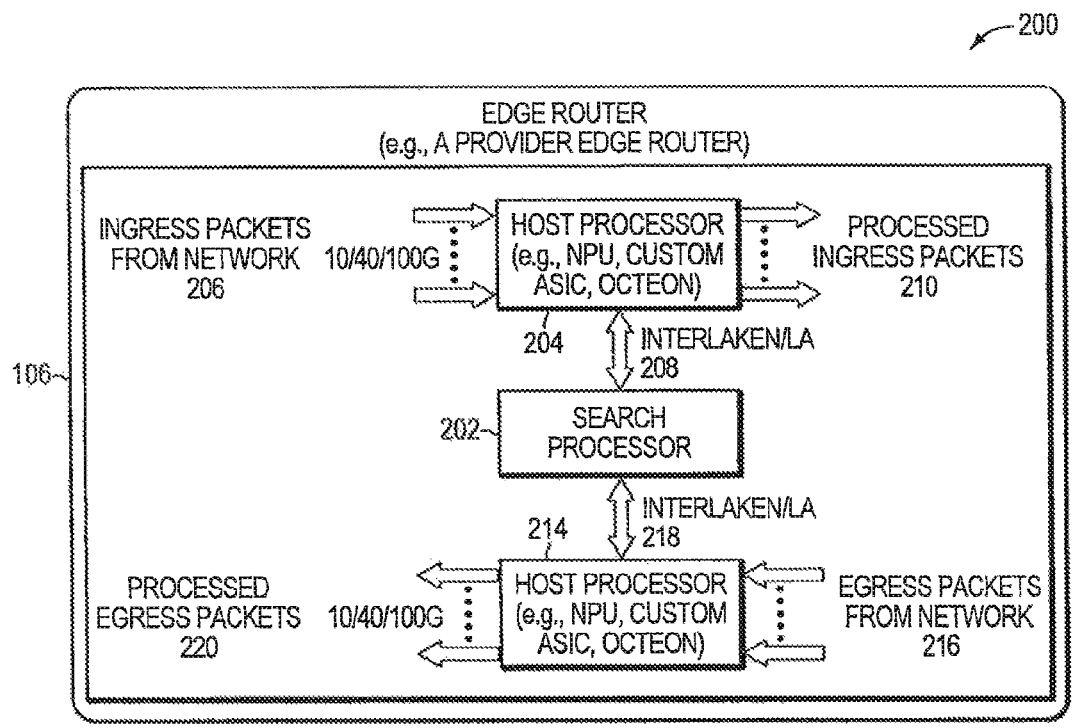
FIGS. 2A-2C are block diagrams illustrating example embodiments of a search processor employed in routers.

FIG. 2A is a block diagram 200 illustrating an example embodiment of a search processor 202 employed in an edge router 106. An edge router 106, such as a provider edge router, includes the search processor 202, a first host processor 204 and a second host processor 214. The first host processor 204 is configured as an ingress host processor. The first host processor 204 receives ingress packets 206 from a network. The first host processor 204 forwards a lookup request including a packet header (or field) from the ingress packets 206 to the search processor 202 using an Interlaken interface 208. The search processor 202 then processes the packet header using a plurality of rule processing engines employing a plurality of rules to determine a path to forward the ingress packets 206 on the network. The search processor 202, after processing the lookup request with the packet header, forwards the path information to the first host processor 204, which forwards the processed ingress packets 210 to another network element in the network.

Likewise, the second host processor 214 is an egress host processor. The second host processor 214 receives egress packets to send from the network 216. The second host processor 214 forwards a lookup request with a packet header (or field) from the egress packets 216 to the search processor 202 over a second Interlaken interface 218. The search processor 202 then processes the packet header using a plurality of rule processing engines employing a plurality of rules to determine a path to forward the packets on the network. The second host processor 214 forwards the processed egress packets 220 to another network element in the network.

Figure 2B:
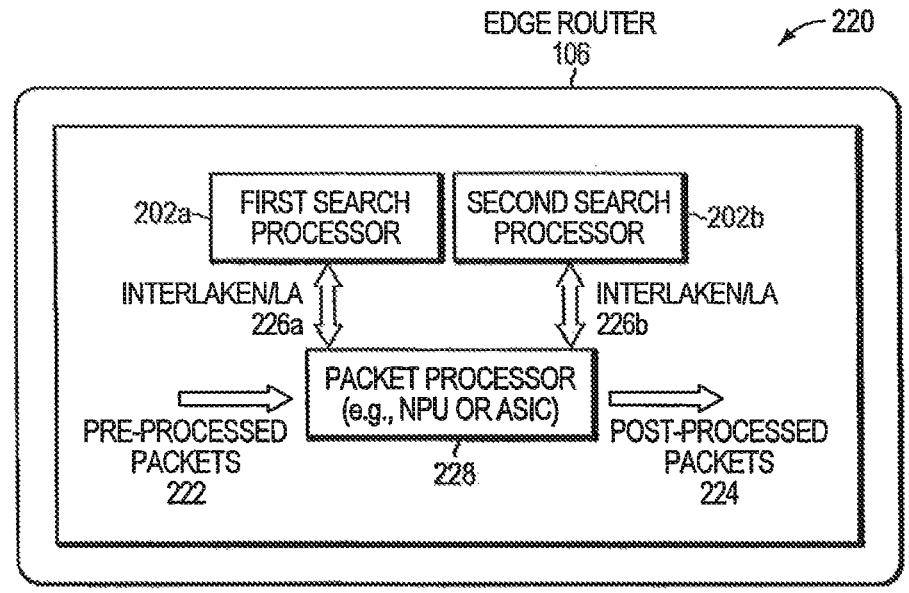

FIG. 2B is a block diagram 220 illustrating another example embodiment of an edge router 106 configured to employ the search processor 202. In this embodiment, the edge router 106 includes a plurality of search processors 202, for example, a first search processor 202a and a second search processor 202b. The plurality of search processors 202a-b are coupled to a packet processor 228 using a plurality of Interlaken interfaces 226a-b, respectively. The edge router 106 receives pre-processed packets 222 at the packet processor 228. The packet processor 228 forwards a lookup request (including packet header or particular fields from packet header) to one of the search processors 202a-b. One of the search processors 202a-b searches the packet headers for an appropriate forwarding destination for the pre-processed packets 222 based on a set of rules and data within the packet header, and responds to the lookup request to the packet processor 228. The packet processor 228 then sends the post processed packets 224 to the network based on the lookup request performed by the search processors 202a-b.

Figure 2C:
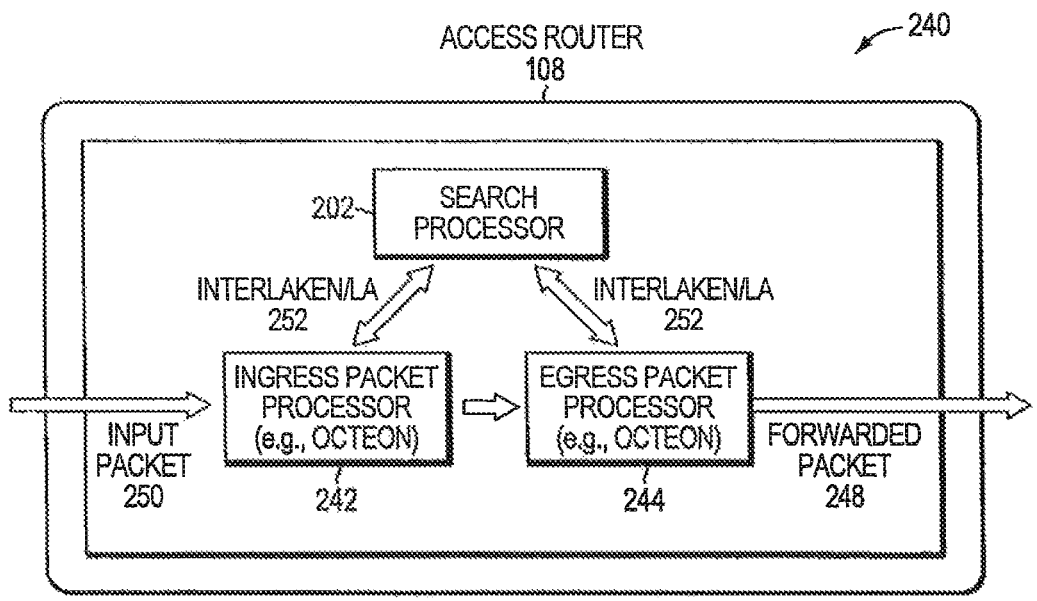

FIG. 2C is a block diagram 240 illustrating an example embodiment of an access router 108 employing the search processor 202. The access router 108 receives an input packet 250 at an ingress packet processor 242. The ingress packet processor 242 then forwards a lookup request with a packet header of the input packet 250 to the search processor 202. The search processor 202 determines, based on packet header of the lookup request, a forwarding path for the input packet 250 and responds to the lookup requests over the Interlaken interface 252 to the egress packet processor 244. The egress packet processor 244 then outputs the forwarded packet 248 to the network.

FIG. 3A is a diagram 300 of an example embodiment of a router architecture. The router architecture includes a switched backplane 302 coupled with a processor card 303 that includes a processor 308 and a memory 304. The switched backplane 302 is further coupled with a plurality of line cards 306a-h. Each line card 306a-h includes a search processor as described herein.

FIG. 3B is a block diagram 320 illustrating an example embodiment of a router employing the search processor 202. The router includes the switched backplane 302 which is coupled to the line cards 306a-b and the processor card 303. The processor card 303 includes a processor 308 and a routing table 328, which can be stored in the memory 304 of the processor card 303. Each line card 306a-b includes a respective local buffer memory 322a-b, a forwarding table 324a-b, and a media access control (MAC) layer 326a-b. The search processor 202 exists within the forwarding table 324a-b of the line card 306a-b.

As an example, a packet is received by the line car 306a at the MAC layer 326a. The MAC layer 326a sends the packet to the forwarding table 324a. Then, the packet and appropriate forwarding table information is stored in the local buffer memory 322a. Based on the determination, the router selects an appropriate line card 306b, stores the packet and forwarding information in the local buffer memory 322b of the appropriate line card, and forwards the packet out to the network.

FIG. 3C is a block diagram 340 of another embodiment of a router including the switched backplane 302. The switched backplane 302 is coupled to the processor card 303, the line cards 342b-h, and a service card 342a. The processor card 303 includes the memory 304 and the processor 308. The service card 342a is a type of line card 342a-h. Further, the search processor described herein can also exist on the service card 342a.

FIG. 3D is a block diagram 360 illustrating an example embodiment of a router employing the switched backplane 302. The switched backplane 302 is coupled with the processor card 303 and the service card 342a or line cards 342b-h. The line cards 342a-b can either be a service card 342a or line card 342b-h. The line card 342a-b includes a forwarding table and corresponding policies module 344a-b, and a MAC layer 326a-b. The search processor 202 is included in the line card 342a-b. The line card 342a receives a packet from a network through the MAC layer 326a at the forwarding table and policies module 344a. The search processor 202 processes the packet according to the forwarding table and policies module 344a according to the routing table 328 in the processor card 303 and forwards the packet to an appropriate line card 342b to be forwarded into the network.

Generally speaking, packets received are matched with rules that determine actions to take with a matched packet. Generic packet classification requires a router to classify a packet on the basis of multiple fields in a header of the packet. Each rule of the classifier specifies a class that a packet may belong to, according to criteria on 'F' fields of the packet header, and associates an identifier (e.g., class ID) with each class. For example, each rule in a flow classifier is a flow specification, in which each flow is in a separate class. The identifier uniquely specifies an action associated with each rule. Each rule has multiple fields. An ith field of a rule R, referred to as R[i], is a regular expression on the ith field of the packet header. A packet P matches a particular rule R if for every i, the ith field of the header of P satisfies the regular expression R[i].

Figure 4:
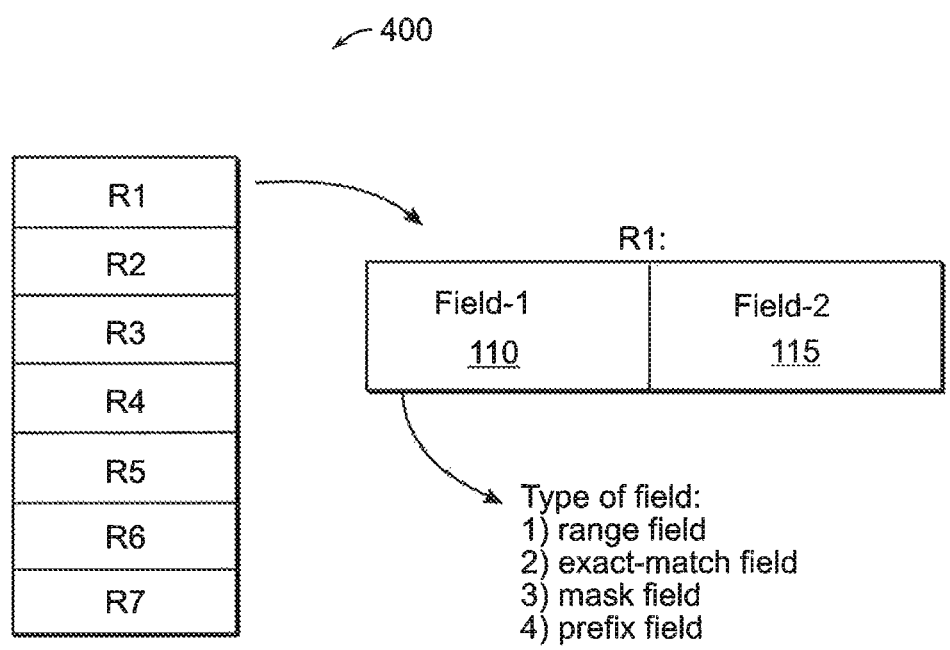
FIG. 4 is a block diagram of example rule with fields.

FIG. 4 shows a classifier table 400 including rules for classifying a packet or "key." As shown, the classifier table 400 contains seven rules R1-R7 each containing two fields, Field-1 110, and Field-2 115. Although the table 400 shows rules being 2-tuple (e.g., containing only two fields), it should be noted that rules may contain n number of fields and be n-tuple. Each rule specifies one or more values (e.g., Internet Protocol (IP) addresses or Layer 4 ports or protocols) in each field, also called a "dimension," to be matched against a key.

Figure 13A:
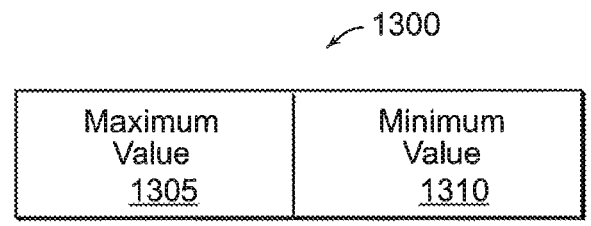
FIGS. 13A-13D are diagrams of a range field for a range match, exact-match field for an exact match, prefix field for a prefix match, and mask field for a mask match, respectively.
Figure 13B:
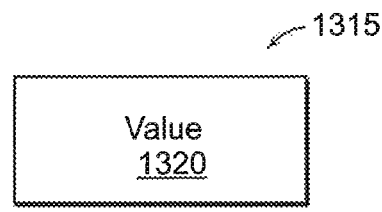

With reference to FIGS. 13A-13D, each dimension of a rule is associated with one of the following types of match: range match, exact-match, prefix match, and mask match. FIG. 13A shows an example of a range field 1300 for a range match. The range field 1300 has a maximum value 1305 and minimum value 1310. The range match determines whether a given key is within the maximum value 1305 and minimum value 1310 as set in the range field 1300. FIG. 13B shows an example of an exact match field 1315 for an exact match. The exact match field 1315 has a value 1320. The exact match determines whether a given key exactly matches the value 1320 as set in the exact match field 1315.

Figure 13C:
Figure 13D:
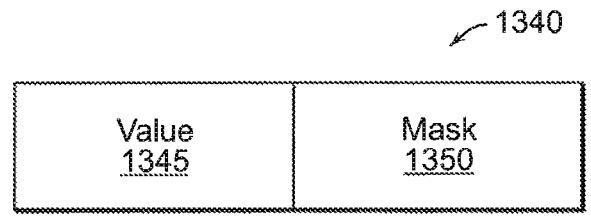

FIG. 13C shows an example of a prefix field 1325 for a prefix match. The prefix field 1325 includes a length 1330 and value 1335. The prefix match determines whether a number of bits, as set by the length 1330, of the value 1335 matches a first set of bits in a given key. For example, given the length 1330 of eight bits, the prefix match matches a first eight bits of a key to the first eight bits of the value 1335. FIG. 13D shows an example of a mask field 1340 for a mask match. The mask field 1340 includes a value 1345 and mask 1350. The mask match determines whether a given set of bits in a key, as indicated by the mask 1350, matches the value 1345. Collectively, the content representing these values, are referred to as "dimension data" of a rule.

Figure 14:
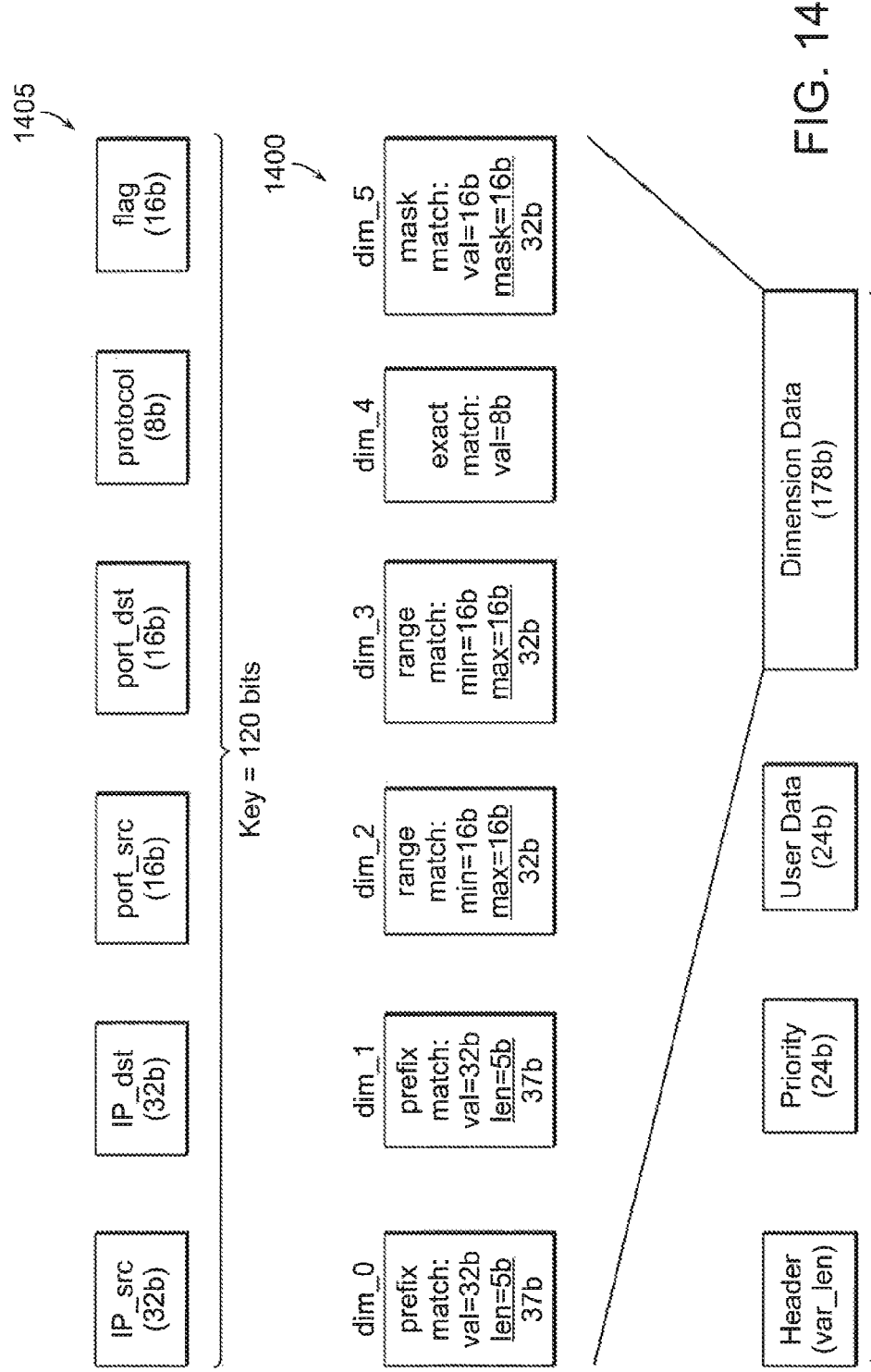
FIG. 14 is a diagram showing an example of rule with six dimensions.

FIG. 14 shows an example rule 1400, also known as a "key matching rule," used to match a key 1405. In this example, the key 1405 is an IPv4 header with the fields as shown. The rule 1400 is a six-tuple rule with six dimensions (dim_0, dim_1, dim_2, dim_3, dim_4, and dim_5). Each of the dimensions contains information used to match one of the fields in the key 1405. For example, the first dimension, dim_0, specifies a prefix match using the first five bits of a 32-bit value given in the dimension. For this prefix match, a search processor (e.g., the search processor 202 of FIG. 2A) compares the first five bits of the IP address in the source IP field with the first five bits of the value in dim_0 (as described above with reference to FIG. 13C) and the search processor responds with a match or no-match response.

Classes specified by the rules may overlap. For instance, one packet may match several rules. In this case, when several rules overlap, an order in which the rules appear in the classifier may determine the relative priority of the rule. In other words, a packet that matched multiple rules belongs to the class identified by the identifier (class ID) of the rule among them that appears first in the classifier. Alternatively, a unique priority associated with a rule may determine its priority, for example, the rule with the highest priority.

Figure 5:
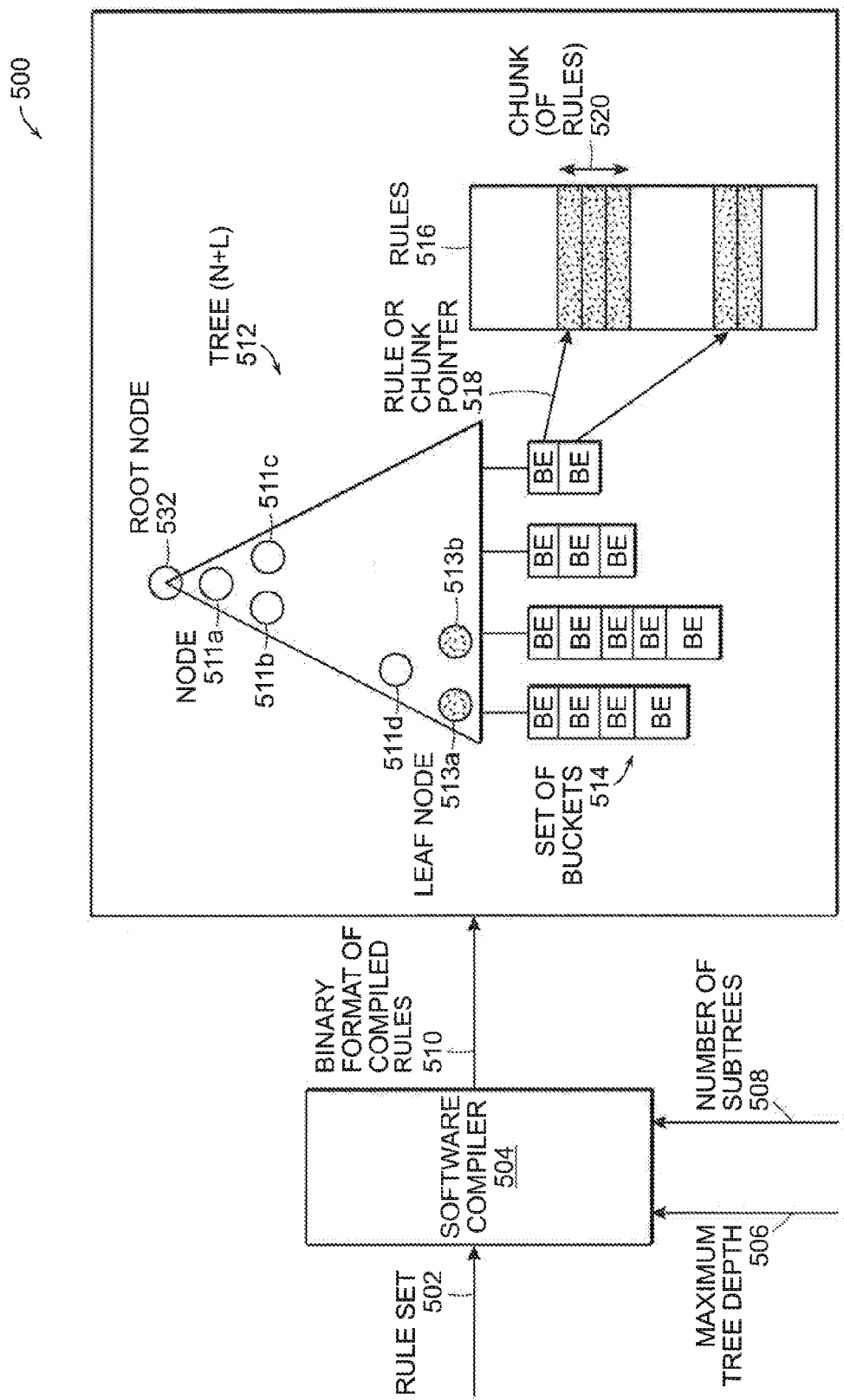
FIG. 5 is a block diagram illustrating an example embodiment of a compiler loading rules into a memory structure.

FIG. 5 is a block diagram 500 illustrating an example embodiment of a compiler loading rules into a memory structure. A software compiler 504 receives a rule set 502. The software compiler 504 generates a binary format of compiled rules 510. The binary format of compiled rules 510 includes a tree 512, buckets 514 and rules 516. The tree 512 includes nodes 511a-d, leaf nodes 513a-b, and a root node 532. Each leaf node 513a-b of the tree 512 points to one of a set of buckets 514. Within each bucket are bucket entries which contain rule or chunk pointers 518. The rules 516 include chunks of rules 520. A chunk 520 (of rules) can be a sequential group of rules, or a group of rules scattered throughout the memory, either organized by a plurality of pointers or by recollecting the scattered chunk 520 (e.g., using a hash function).

Figure 6:
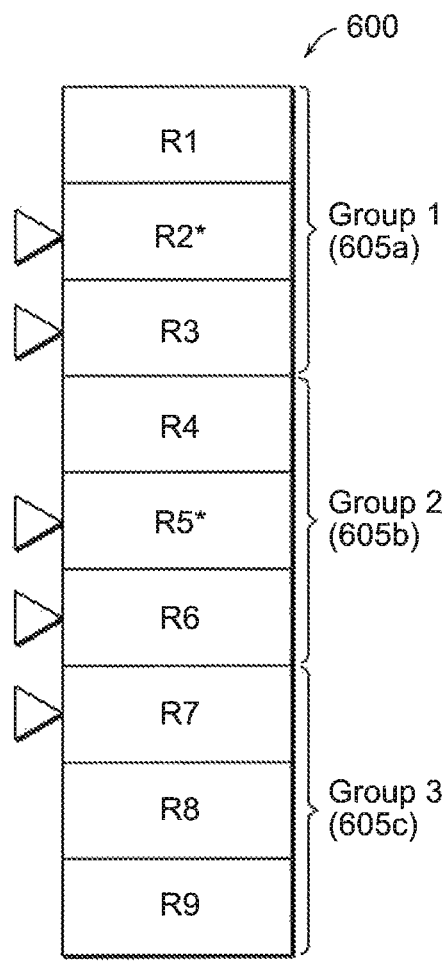
FIG. 6 is a block diagram of a set of rules for matching a key divided into groups of prioritized rules including skip group rules.

FIG. 6 shows an example set of rules 600 configured using a rule groups feature in which rules are separated into a large number of groups of rules, each containing a small number of rules. The groups are prioritized with group 1 (605a) having a higher priority than group 2 (605b) and group 3 (605c), and group 2 (605b) having a higher priority than group 3 (605c). The rules are prioritized within each group, for example, rule R1 has a higher priority than rules R2 and R3, and R2 has a higher priority than rule R3, etc. A key is compared against all the rules in a first group. If the key does not match any rule in the first group, then the key is compared against the rules in a second group and on down the list of groups.

One or more rules in a group are skip group rules (e.g., rules having a skip group flag set). If the key matches a skip group rule, the search within that group stops and moves onto the next group. In the example shown in FIG. 6, rules R2 and R5 are skip group rules. Assume a key matches rules R2, R3, R5, R6, and R7 because the rules overlap. Without a skip group rule feature, rule R2 is matched because the rule has a priority higher than the priorities of rules R3, R5, R6, and R7. With a skip group rule feature, however, matching skip group rule R2 forces the search to skip over the lower priority rules of the group 1 (605a), viz., rule R3 and the search tries matching rules in the next group, group 2 (605b). In group 2 (605b), the key matches rules R5 and R6. But because rule R5 is a skip group rule, the skip group feature forces the search to skip over the other matching lower priority rule of group 2 (605b) viz. rule R6. The search tries matching rules in the next group, group 3 (605c). In group 3 (605c), the key matches rule R7. Because rule R7 is the next highest priority rule to match and is not influenced by any other higher priority skip group rule belonging to group 3 (605c), rule R7 is the matched rule for this particular key. It may be convenient to call skip group rules as "negative" in that they affect lower priority rules but are never matched themselves.

Figure 7:
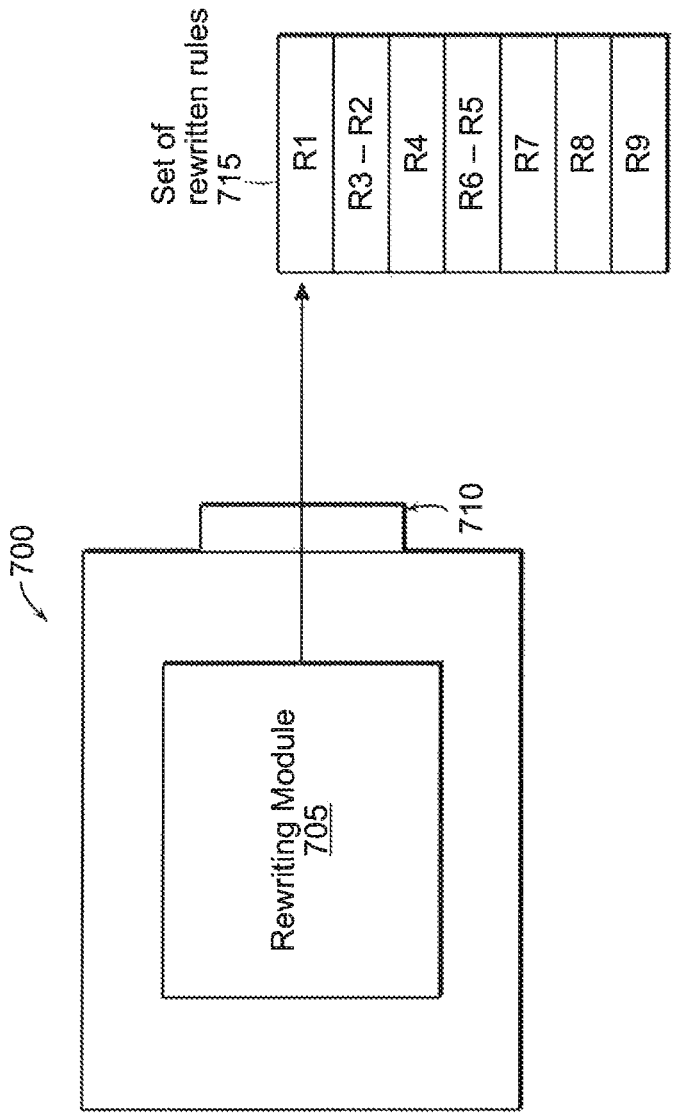
FIG. 7 is a functional diagram of an example of a compiler rewriting lower priority rules based on a skip group rule.

FIG. 7 shows an example of a compiler 700 for carrying out an approach of providing the skip group rule functionality described above. The compiler includes a rewriting module 705 and interface 710 communicatively coupled to each other as shown. A set of rules for matching a key is provided to the compiler 700, for example the example set of rules 600 of FIG. 6. Again, the set of rules 600 is divided into groups of rules according to the rule group feature described above. The set of rules 600 includes skip group rules R2 and R5.

The rewriting module 705 rewrites rules belonging to a same group as the skip group rule and having priorities lower than the skip group rule. These lower priority rules are rewritten based on the skip group rule such that when a search processor matches a key to the skip group rule, the search processor skips over the lower priority rules and searches a next group of rules. The rewriting module 705 outputs a set of rewritten rules 715 as shown. The interface 710 provides the set of rewritten rules 715 to the search processor to match against a key.

One advantage of the foregoing approach (and its examples described herein) is that the search processor requires no additional logic to process a skip group rule to provide the skip group rule functionality. To the search processor, the rules affected by the skip group rule are typical rules. Advantageously, the approach adds the capability to force the search processor to skip over rules within a group of rules without adding complexity to the search processor. In turn, this keeps the power and size requirements of the search processor unchanged.

Another advantage of the foregoing approach (and its examples described herein) is that a user can define any number of skip group rules as well as any number of groups. This is beneficial because, for example, a service provider can devise a comprehensive access control list (ACL) that is well tailored to the needs of end users. Such capacity and flexibility make this approach more capable than other approaches to providing skip group rule functionality.

For example, a conventional hardware-based approach uses a ternary content-addressable memory or "TCAM." A TCAM is a hardware device that functions as a fully associative memory. A TCAM cell stores three values: 0, 1, or 'X,' which represents a don't-care bit and operates as a per-cell mask enabling the TCAM to match rules containing wildcards, such as a kleene star '*.' In operation, a whole packet header is presented to a TCAM to determine which entry (rule) it matches. However, the complexity of the TCAM hardware has allowed only a limited and inflexible number of skip group rules as well as limited number of groups. Typically, a user can only define one skip group rule.

A convenient example of the compiler 700 rewrites rules with priority lower than a skip group rule by subtracting the skip group rule from each of the lower priority rules. This process is repeated for each group containing a skip group rule, independently. In given group, a skip group rule is subtracted from lower priority rules belonging to that group. The group may contain many rules and, as mentioned above, the skip group rule approach does not put any restriction on a number of rules in a group as well as total number of separate groups in the rules set. Each lower priority rule is rewritten as one or more rewritten rules. For rules having more than one field, the compiler 700 subtracts the skip group rule from each of the lower priority rules on a field-by-field basis. In some examples of the compiler 700 the order in which the compiler 700 processes multiple fields may be selected or processed as they are received. In any case, the order in which the compiler 700 processes multiple fields does not matter.

In the case of a range field, each rule is represented by a minimum value and maximum value. The compiler 700 is provided with a skip group rule including a range field of a first range and lower priority rules each including a corresponding range field of a second range. For each lower priority rule, the compiler 700 subtracts the first range from a respective second range and includes the subtracted second range in a rewritten rule.

Figure 8A:
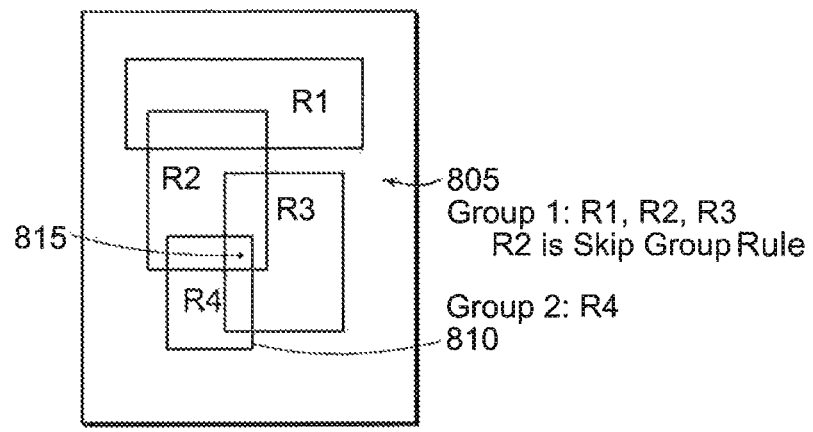
FIGS. 8A and 8B are a series of diagrams showing an example of subtracting a skip group rule from lower priority rules in two-dimension search space.
Figure 8B:
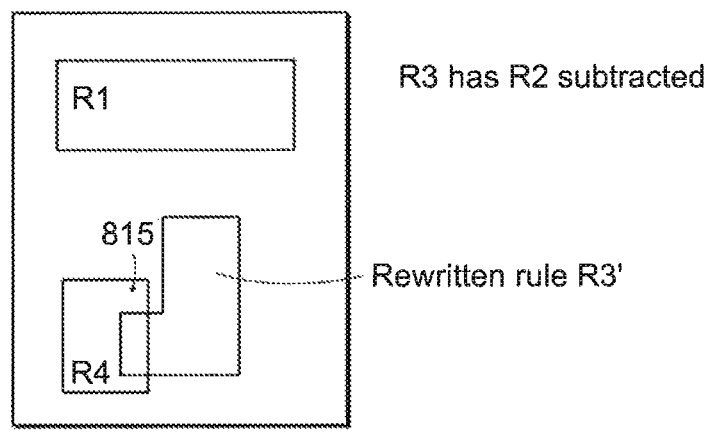

FIGS. 8A and 8B show the result of subtracting a skip group rule from lower priority rules in a two-dimensional search space. As shown, group 1 (805) includes rules R1, R2, and R3; and group 2 (810) includes rule R4. Each of the rules is a two-tuple rule having a first range field and a second range field. As shown, the rules are represented, graphically, as two-dimensional boxes. Each of the boxes has an edge representing the first range field and another edge representing the second range field. A black dot 815 represents a key that is matched against the rules.

In this example, rule R2 is a skip group rule for group 1 (805). According to the definition of the skip group rule, a lookup for the key 815 matches rule R2 and then skips the lower priority rules of the group 1 (805), viz., rule R3. The lookup then proceeds to the group 2 (810) and matches rule R4.

FIG. 8B shows the rewritten rules after the subtraction. As shown, rule R2 no longer exists and R3 is trimmed forming rewritten rule R3'. As a result, the lookup for the key 815 matches rule R4.

Figure 9A:
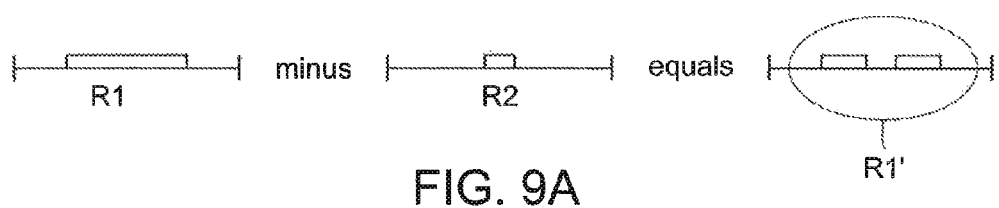
FIG. 9A is a diagram of an example of subtracting a skip group rule from a lower priority rule, each rule having one range field.
Figure 9B:
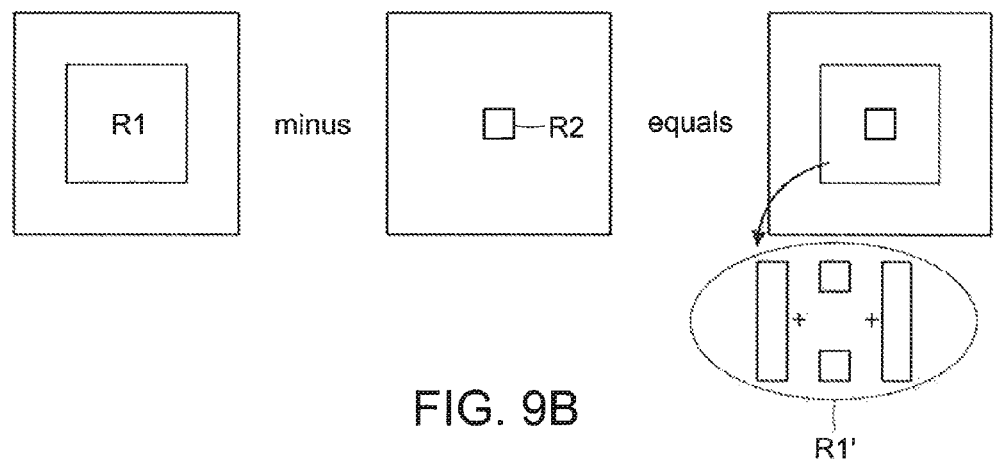
FIG. 9B is a diagram of an example of subtracting a skip group rule from a lower priority rule, each rule having two range fields.
Figure 9C:
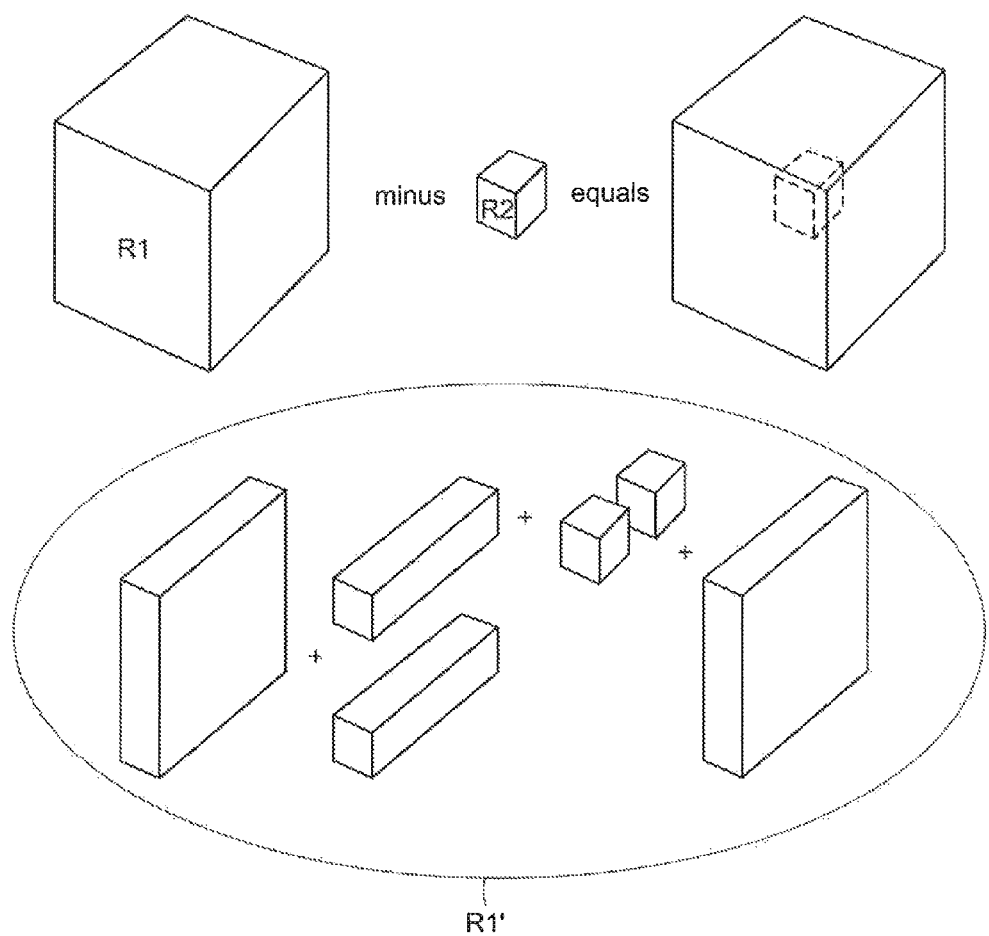
FIG. 9C is a diagram of an example of subtracting a skip group rule from a lower priority rule, each rule having three range fields.

Examples of rules with range, prefix, and exact-match field types can be represented by an n-dimensional box with a minimum value and maximum value for each field (for an exact-match field, the minimum and maximum values are the same). FIGS. 9A-C show examples of subtracting a skip group rule R2 from a lower priority rule R1, in which each rule has one, two, and three fields, respectively. The results of the subtraction as rewritten rule R1'. (Examples of rules with four or more dimensions are left as an exercise for the reader.)

In some cases, subtracting one box (e.g., the skip group rule R2) from another (e.g., lower priority rule R1) does not necessarily result in a box (e.g., rewritten rule R1'). That is, it may not be possible to represent a subtracted multi-dimensional region as single rule. The result of the subtraction, however, is a shape that can be decomposed into boxes, in which each box can be represented by a single rule. In one case, each subtraction results in twice as many boxes as there are dimensions. FIGS. 9A-C show the rewritten rule R1' decomposed into two, four, and six rules, respectively. The minimum number of boxes resulting from a subtraction is zero, which happens if the subtracted rule encompasses the other rule. If there is no intersection between a skip group rule and a lower priority rule, the lower priority rule is written as it is without any change.

Conceptually, one can think of the process of decomposing the boxes (i.e., rules) as happening one dimension at a time. In the two-dimensional example above, the compiler 700 (FIG. 7) may process the horizontal dimension (field) first, peeling off the two large side boxes, and then the remaining upper and lower boxes. The compiler 700 (FIG. 7) may just as well process the vertical dimension first. The order in which the compiler processes the dimensions does not matter. Different orders of decomposition generate different sets of boxes that are equivalent. And, thus resulting in a subtracted rule being represented by more than one rule.

There may be more than one skip group rule in a group. Consider an example group of prioritized rules R1, R2, R3, R4, R5, and R6 in which R2 and R4 are skip group rules. The compiler 700 (FIG. 7) subtracts skip group rule R2 from the lower priority rules R3, R4, R5, and R6, and subtracts skip group rule R4 from R5 and R6. The result of the subtraction are rewritten rules R3-R2, R5-R2-R4, and R6-R2-R4, which may be also written as R3-R2, R5-R2, R5-R4, R6-R2, and R6-R4.

For mask fields, each rule is represented as a value/mask pair. In one example of the approach, the subtraction of a mask field of a skip group rule (B) from a mask field of a lower priority rule (A) i.e., A-B, is equivalent to the mask field of the lower priority rule (A) intersected with the inverse of the mask field of the skip group rule (B). The approach is described below with reference to the following example:

mask field of lower priority rule (A)=xxx0 (equivalent to a list of decimal values {0, 2, 4, 6, 8, 10, 12, 14})

mask field of skip group rule (B)=1x0x (equivalent to a list of decimal values {8, 9, 12, 13})

in which, 0 or 1 is a value bit, and x represents a 'don't-care' bit.

An inverse of a mask field of a skip group rule cannot always be represented as a single masked value. In that case, the inverse of the mask field of a skip group rule is several masked values or'ed together. To calculate the inverse of the mask field of a skip group rule, for each bit in the value that is a 0 or 1 (not don't-care bit x) create a masked value with that bit inverted and set all other bits to don't-care bit (x). The inverse of the mask field of a skip group rule (B) is an or'ed list of the mask values created thus created (B').

In the example, from the masked value 1x0x, create masked values 0xxx and xx1x. The inverse of 1x0x is (0xxx or xx1x).

The result of the subtraction, which is the mask field of a lower priority rule (A) intersected with the or'ed list of the mask values created (B'), is calculated by intersecting the mask field of the lower priority rule (A) with each of the mask values from the list (B') and then or'ing the results. Again, this may be represented as more than a single masked value.

Intersecting the mask field of the lower priority rule (A) with each of the mask values from the list (B') is done bit-by-bit according to the following:

A don't-care bit intersected with another don't-care bit yields a don't-care bit.
A don't-care bit intersected with a value yields the value.
A value intersected with an equal value yields that value.
A value intersected with an unequal value means the entire intersection is empty.

In the example, intersecting the mask field of the lower priority rule of xxx0 (A) with each of the mask values from the list of 0xxx and xx1x (B') and then or'ing the results producing a masked field of a rewritten rule (C) is a follows:

C=xxx0 and (0xxx or xx1x)
C=(xxx0 and 0xxx) or (xxx0 and xx1x)
C=0xx0 or xx10 in which the operation "and" represents computing an intersection, as per the above explanation.

The resulting masked field of the rewritten rule (C), 0xx0 or xx10, is equivalent to lists of values {0, 2, 4, 6} or {2, 6, 10, 14}, which is equivalent to a list of values {0, 2, 4, 6, 10, 14}.

For prefix fields, each field is represented as a value/length pair. A convenient example of the compiler processes a prefix field as a special case of a mask field in which the 'don't-care' bits are the least significant bits (LSB's). FIG. 10 shows an example of subtracting a prefix field of a skip group rule 100X (decimal equivalent 8 and 9) from a prefix field of the lower priority rule 10XX (decimal equivalent 8, 9, 10, and 11). The don't care bits are the least significant bits in the prefixes. As shown, the result of the subtraction is a prefix field of 101X (decimal equivalent 10 and 11) for the rewritten rule.

Figures 11A, 11B, 11C, 11D:
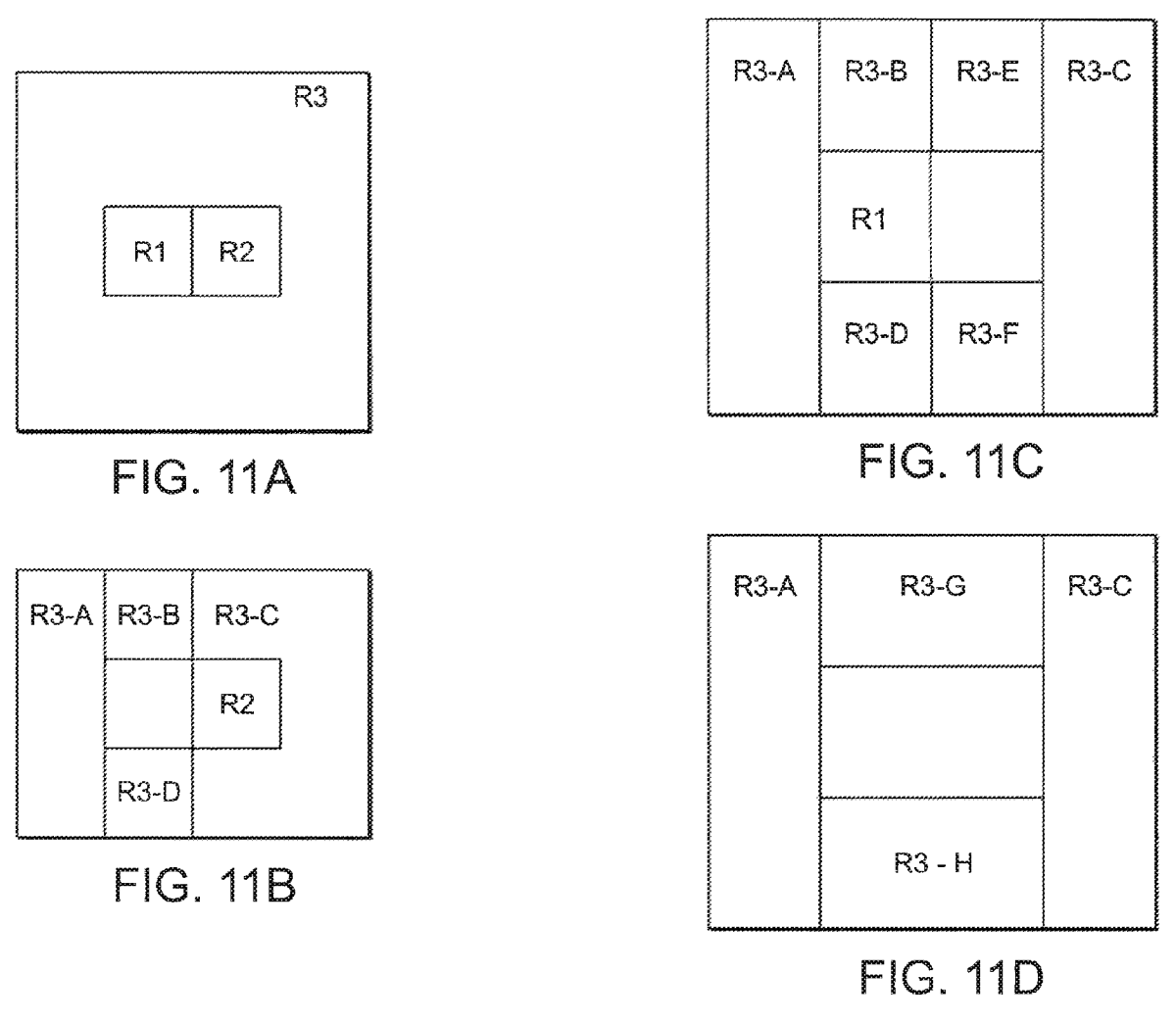

FIG. 11A shows an example set of two-tuple rules R1, R2, and R3 each with range fields X and Y. Rule R1 has a higher priority than rules R2 and R3, and rule R2 has a higher priority than rule R3. Rules R1 and R2 are skip group rules.

FIGS. 11B and 11C show an example of the compiler subtracting rule R1 from rule R3 and subtracting rule R2 from rule R3. The results of the subtraction are rewritten rules, including rules R3-A, R3-B, R3-C, R3-D, R3-E, and R3-F.

FIG. 11D shows the compiler coalescing rewritten rules R3-B and R3-E into a coalesced rule R3-G and coalescing rewritten rules R3-D with R3-F into another coalesced rule R3-H. In the example, range field X of the rewritten rule R3-B and the corresponding range field X of the rewritten rule R3-E are combined into one range field X of the coalesced rule R3-G. For example, given a first range field of 1-10 and second range field of 11-20, the compiler combines them into a continuous range field of 1-20. (A similar combination of range fields occurs for the coalesced rule R3-H.) Coalescing rewritten rules is advantageous because it reduces the number of rules stored in memory and, thus, decreases time to lookup rules to match a key.

Figure 12:
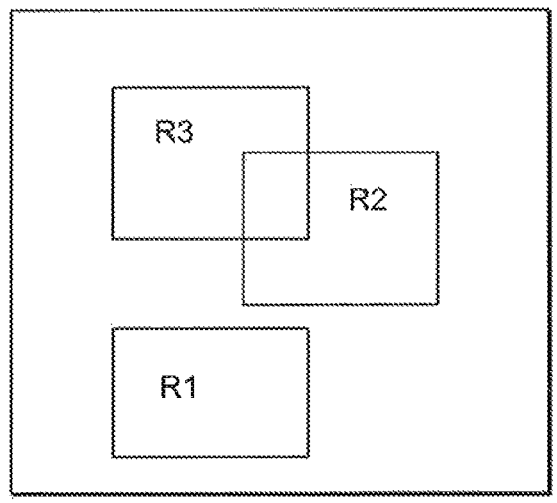
FIG. 12 is a diagram of an example of non-overlapping rules.

FIG. 12 shows an example group of rules include rules R1, R2, and R3. Rule R3 has a higher priority than rules R1 and R2, and rule R1 has a higher priority than rule R2. Subtracting rule R1 from rule R2 does not affect rule R2 because rules R1 and R2 do not overlap. A convenient example of the compiler, determines whether a skip group rule and a lower priority rule overlap. The compiler rewrites the lower priority rule based on the determination. When the compiler determines there is no overlap between the skip group rule and lower priority rule, the compiler, in one example, rewrites the lower priority rule as it is. In another example, the compiler leaves the non-lapping lower priority rule unchanged.

The above-described methods and systems can be implemented in digital electronic circuitry, in computer hardware, firmware, and/or software. The implementation can be as a computer program product (i.e., a computer program tangibly embodied in an information carrier medium). The implementation can, for example, be in a machine-readable storage device for execution by, or to control the operation of, data processing apparatus. The implementation can, for example, be a programmable processor, a computer, and/or multiple computers.

In one example, a computer program can be written in any form of programming language, including compiled and/or interpreted languages, and the computer program can be deployed in any form, including as a stand-alone program or as a subroutine, element, and/or other unit in image processor 100 suitable for use in a computing environment to carry out the features and functions of various examples discussed herein. A computer program can be deployed to be executed on one computer or on multiple computers at one site.

Method steps or operations can be performed as processes by one or more programmable processors executing a computer program to perform functions of various examples by operating on input data and generating output. Method steps can also be performed by and an apparatus can be implemented as special purpose logic circuitry. The circuitry can, for example, be a field programmable gate array (FPGA) and/or an application specific integrated circuit (ASIC). Modules, subroutines, and software agents can refer to portions of the computer program, the processor, the special circuitry, software, and/or hardware that implements that functionality.

Compiler 700 (FIG. 7) may comprise one or more processors suitable for the execution of a computer program include, by way of example, both general and special purpose microprocessors, and any one or more processors of any kind of digital computer. Generally, a processor receives instructions and data from a read-only memory or a random access memory or both. The elements of a computer may comprise a processor for executing instructions and one or more memory devices for storing instructions and data. Generally, a computer can include, can be operatively coupled to receive data from and/or transfer data to one or more mass storage devices (e.g., a memory module) for storing data (e.g., magnetic, magneto-optical disks, or optical disks). The memory may be a tangible non-transitory computer-readable storage medium having computer-readable instructions stored therein for processing images, which when executed by one or more processors (e.g., compiler 700 of FIG. 7) cause the one or more processors to carry out or implement the features and functionalities of various examples discussed herein.

Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computing device having a display device. The display device can, for example, be a cathode ray tube (CRT) and/or a liquid crystal display (LCD) monitor, and/or a light emitting diode (LED) monitor. The interaction with a user can, for example, be a display of information to the user and a keyboard and a pointing device (e.g., a mouse or a trackball) by which the user can provide input to the computing device (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described systems and techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computing device having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system may be coupled to and/or include clients and servers. A client and a server are generally remote from each other and typically interact through a communication network. The relationship of client and server arises by virtue of computer programs running on the respective computing devices and having a client-server relationship to each other.

Communication networks may include packet-based networks, which can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks may include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The computing device may include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a World Wide Web browser (e.g., INTERNET EXPLORER® available from Microsoft Corporation, of Redmond, Wash.). The mobile computing device includes, for example, a BLACKBERRY® provided by Research In Motion Limited of Waterloo, Ontario, Canada.

"Comprise," "include," and/or plural forms of each are open ended and include the listed parts and can include additional parts that are not listed. "And/or" is open ended and includes one or more of the listed parts and combinations of the listed parts.

Although the above disclosure discusses what is currently considered to be a variety of useful examples, it is to be understood that such detail is solely for that purpose, and that the appended claims are not limited to the disclosed examples, but, on the contrary, are intended to cover modifications and equivalent arrangements that are within the spirit and scope of the appended claims.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method for forcing a search processor to skip over rules within a group of rules, the method comprising:

in a compiler provided with a set of rules for matching a key, the set of rules divided into groups, each group being prioritized with respect to each other and each rule within each group being prioritized with respect to each other, and the set of rules including at least one skip group rule;

rewriting rules belonging to a same group as the skip group rule and having priorities lower than the skip group rule, the lower priority rules being rewritten based on the skip group rule such that in response to matching a key to the skip group rule, a search processor skips over the skip group rule and the lower priority rules;

providing the rewritten rules to the search processor;

wherein rewriting the lower priority rules includes subtracting the skip group rule from each of the lower priority rules, each lower priority rule being rewritten with a respective subtracted rule as one or more rewritten rules;

wherein subtracting includes, given the skip group rule including a field having a first bitmask and each of the lower priority rules including a corresponding field having a second bitmask, for each second bitmask, inverting the first bitmask and intersecting the inverted first bitmask with a subject second bitmask to form an third bitmask, and including the third bitmask in a rewritten rule;

wherein intersecting the inverted first bitmask with the subject second bitmask includes, bit-by-bit:

intersecting a don't-care bit of the inverted first bitmask with a don't-care bit of the subject second bitmask yields a don't-care bit in the third bitmask;

intersecting a don't-care bit with a value bit yields the value bit in the third bitmask:

intersecting a value bit with an equal value bit yields the value bit in the third bitmask; and intersecting a value bit with an unequal value bit yields the third bitmask having a null value.

2. The method of claim 1 wherein each rule includes at least one field and wherein subtracting includes subtracting, on a field-by-field basis, the skip group rule from each of the lower priority rules.

3. The method of claim 1 wherein a group of rules includes a first skip group rule and a second skip group rule; and wherein subtracting includes subtracting the first skip group rule from each of the lower priority rules and subtracting the second skip group rule from each of the lower priority rules having priorities lower than the second skip group rule.

4. The method of claim 1, wherein subtracting further includes, given the skip group rule including a field having a first range and each of the lower priority rules including a corresponding field having a second range, for each lower priority rule, subtracting the first range from a respective second range and including the subtracted range in a rewritten rule.

5. The method of claim 4, wherein the subtracted range includes a first sub-range and a second sub-range, the first sub-range and second sub-range being included in a first rewritten rule and a second rewritten rule.

6. The method of claim 4, wherein the first range and second range each includes one value.

7. The method of claim 1 wherein inverting the first bitmask includes for each value bit in the first bitmask, creating a mask value by:
   inverting a subject value bit; and
   setting remain bits to don't-care bits; and
   or'ing the mask values and yielding the inverted first bitmask value.

8. The method of claim 1 wherein the first bitmask and the second bitmask are prefixes in which don't-care bits are the least significant bits.

9. The method of claim 1 wherein rewriting includes determining whether the skip group rule and a lower priority rule overlap; and rewriting the lower priority rule as it is.

10. The method of claim 9 wherein, in an event, the determination is the skip group rule and lower priority rule do not overlap, writing the lower priority rule without change.

11. The method of claim 1 further comprising coalescing two or more rewritten rules into a coalesced rule.

12. A system for forcing a search processor to skip over rules within a group of rules, the system comprising:
   a memory having computer executable instructions thereupon;
   at least one interface for receiving a set of rules for matching a key, the set of rules divided into groups, each group being prioritized with respect to each other and each rule within each group being prioritized with respect to each other, and the set of rules including at least one skip group rule, the set of rules including at least one skip group rule;
   a compiler, comprising one or more processors, coupled to the memory and the at least one interface, the computer executable instructions when executed by the compiler cause the compiler to:
   rewrite rules belonging to a same group as the skip group rule and having priorities lower than the skip group rule, the lower priority rules being rewritten based on the skip group rule such that in response to matching a key to the skip group rule, a search processor skips over the skip group rule and the lower priority rules;
   provide the rewritten rules to the search processor;
   wherein the compiler rewrites the lower priority rules by subtracting the skip group rule from each of the lower priority rules, each lower priority rule being rewritten with a respective subtracted rule as one or more rewritten rules;
   wherein given the skip group rule including a field having a first bitmask and each of the lower priority rules including a corresponding field having a second bitmask, for each second bitmask, the compiler subtracts by inverting the first bitmask and intersecting the inverted first bitmask with a subject second bitmask to form an third bitmask, and including the third bitmask in a rewritten rule;
   wherein the compiler intersects the inverted first bitmask with the subject second bitmask includes, bit-by-bit, by:
      intersecting a don't-care bit of the inverted first bitmask with a don't-care bit of the subject second bitmask yields a don't-care bit in the third bitmask;
      intersecting a don't-care bit with a value bit yields the value bit in the third bitmask;
      intersecting a value bit with an equal value bit yields the value bit in the third bitmask; and
      intersecting a value bit with an unequal value bit yields the third bitmask having a null value.

13. A tangible non-transitory computer-readable storage medium having computer readable instructions stored therein for forcing a search processor to skip over rules within a group of rules, which when executed by a compiler provided with a set of rules for matching a key, the set of rules divided into groups, each group being prioritized with respect to each other and each rule within each group being prioritized with respect to each other, the set of rules including at least one skip group rule, cause the compiler to:
   rewrite rules belonging to a same group as the skip group rule and having priorities lower than the skip group rule, the lower priority rules being rewritten based on the skip group rule such that in response to matching a key to the skip group rule, a search processor skips over the skip group rule and the lower priority rules;
   provide the rewritten rules to the search processor;
   wherein the compiler rewrites the lower priority rules by subtracting the skip group rule from each of the lower priority rules, each lower priority rule being rewritten with a respective subtracted rule as one or more rewritten rules;
   wherein given the skip group rule including a field having a first bitmask and each of the lower priority rules including a corresponding field having a second bitmask, for each second bitmask, the compiler subtracts by inverting the first bitmask and intersecting the inverted first bitmask with a subject second bitmask to form an third bitmask, and including the third bitmask in a rewritten rule;
   wherein the compiler intersects the inverted first bitmask with the subject second bitmask includes, bit-by-bit, by:
      intersecting a don't-care bit of the inverted first bitmask with a don't-care bit of the subject second bitmask yields a don't-care bit in the third bitmask;
      intersecting a don't-care bit with a value bit yields the value bit in the third bitmask;
      intersecting a value bit with an equal value bit yields the value bit in the third bitmask; and
      intersecting a value bit with an unequal value bit yields the third bitmask having a null value.

* * * * *